US012670630B2

(12) United States Patent
Ramasubramonian et al.

(10) Patent No.: US 12,670,630 B2
(45) Date of Patent: Jun. 30, 2026

(54) INTER PREDICTION FOR PREDICTIVE GEOMETRY CODING

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 18/508,809

(22) Filed: Nov. 14, 2023

(65) Prior Publication Data

US 2024/0233199 A1    Jul. 11, 2024

Related U.S. Application Data

(60) Provisional application No. 63/479,336, filed on Jan. 10, 2023.

(51) Int. Cl.
 *G06T 9/40* (2006.01)
(52) U.S. Cl.
 CPC ..................................... *G06T 9/40* (2013.01)
(58) Field of Classification Search
 CPC ............ G06T 9/001; G06T 9/004; G06T 9/40
 See application file for complete search history.

(56) References Cited

U.S. PATENT DOCUMENTS

| | | | | |
|---|---|---|---|---|
| 2020/0045342 | A1* | 2/2020 | Bordes | ................. H04N 19/527 |
| 2020/0077065 | A1* | 3/2020 | Schroers | ................. H04N 9/43 |
| 2020/0380731 | A1* | 12/2020 | Vosoughi | ................. G06T 9/00 |
| 2021/0092389 | A1* | 3/2021 | Choi | ...................... H04N 19/59 |
| 2022/0207780 | A1 | 6/2022 | Ramasubramonian et al. | |

OTHER PUBLICATIONS

"G-PCC 2nd Edition Codec Description", 139. MPEG Meeting, Jul. 18, 2022-Jul. 22, 2022; Online, (Motion Picture Expert Group or ISO/IEC JTC1/SC29/WG11). No. n21684, Oct. 20, 2022, XP030306169, 63 Pages, Section 6.
"G-PCC 2nd Edition Codec Description", 142. MPEG Meeting, Apr. 24, 2023-Apr. 28, 2023, ANTALYA, (Motion Picture Expert Group or ISO/IEC JTC1/SC29/WG11), No. n22735 Jul. 16, 2023, 108 Pages, XP030311093, [retrieved on Jul. 16, 2023] Section 6.
International Search Report and Written Opinion—PCT/US2024/010174—ISA/EPO—Apr. 16, 2024 15 Pages.

(Continued)

*Primary Examiner* — Ming Wu
(74) *Attorney, Agent, or Firm* — QUALCOMM Incorporated; Espartaco Diaz Hidalgo

(57) ABSTRACT

Example devices, systems, and techniques are described. An example technique includes determining that resampling is to be applied to a first reference frame for a slice of point cloud data or a frame of the point cloud data. The technique includes applying resampling to the first reference frame to generate a resampled reference frame. The technique includes determining one or more inter prediction candidates based on the resampled reference frame. The technique includes processing the slice of the point cloud data or the frame of the point cloud data based on the one or more inter prediction candidates.

39 Claims, 16 Drawing Sheets

(56) References Cited

OTHER PUBLICATIONS

Loi K L., et al., "[G-PCC][New] Inter Prediction for Predictive Geometry used in conjunction with Additional Global Motion Compensated Reference Frame", 140. MPEG Meeting, Oct. 24, 2022-Oct. 28, 2022, Mainz, Motion Picture Expert Group or ISO/IEC JTC1/SC29/WG11), No. m61019, Oct. 28, 2022, XP030305453, p. 2-p. 3, pp. 1-9.

Ramasubramonian (Qualcomm) A K et al., "[G-PCC] Thoughts on EE13.2 Test 8—Inter Prediction in Predictive Geometry Coding", 141, Mpeg Meeting, Jan. 16, 2023-Jan. 20, 2023, Online, (Motion Picture Expert Group or, ISO/IEC JTC1/SC29/WG11), No. m62218, Jan. 11, 2023 , XP030308038, the Whole Document, 2 Pages.

Ramasubramonian (Qualcomm) A.K., et al., "[G-PCC] [New proposal] Results on Inter Prediction for Predictive Geometry Coding", 138. MPEG Meeting, Apr. 25, 2022-Apr. 29, 2022, Online, (Motion Picture Expert Group Or ISO/IEC JTC1/SC29/WG11), No. m59650-V1, Apr. 26, 2022, pp. 1-19, XP030301862, pp. 2,3,5,6.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

* cited by examiner

100

⊖ Root vertex

◯ Branch vertex with 1 child

⊕ Branch vertex with 2 children

⊘ Branch vertex with 3 children

⦀ Leaf vertex

M=(x,y,z)

600

$\Theta(i)$

Y $\phi$ r

X

Z

Z

+15° $\theta(9)$

+13° $\theta(10)$

+1°

9

10

16

+1°

0°

8

−1°

2

1

−13° $\theta(2)$

−15° $\theta(1)$

LIDAR
EMITTER/
RECEIVER
602

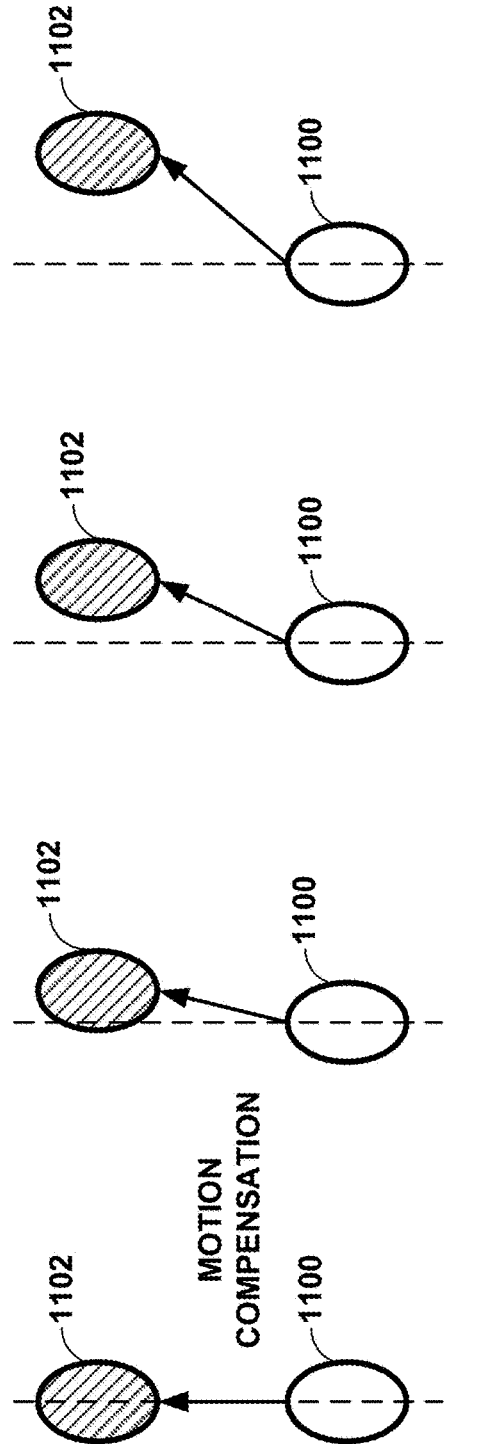
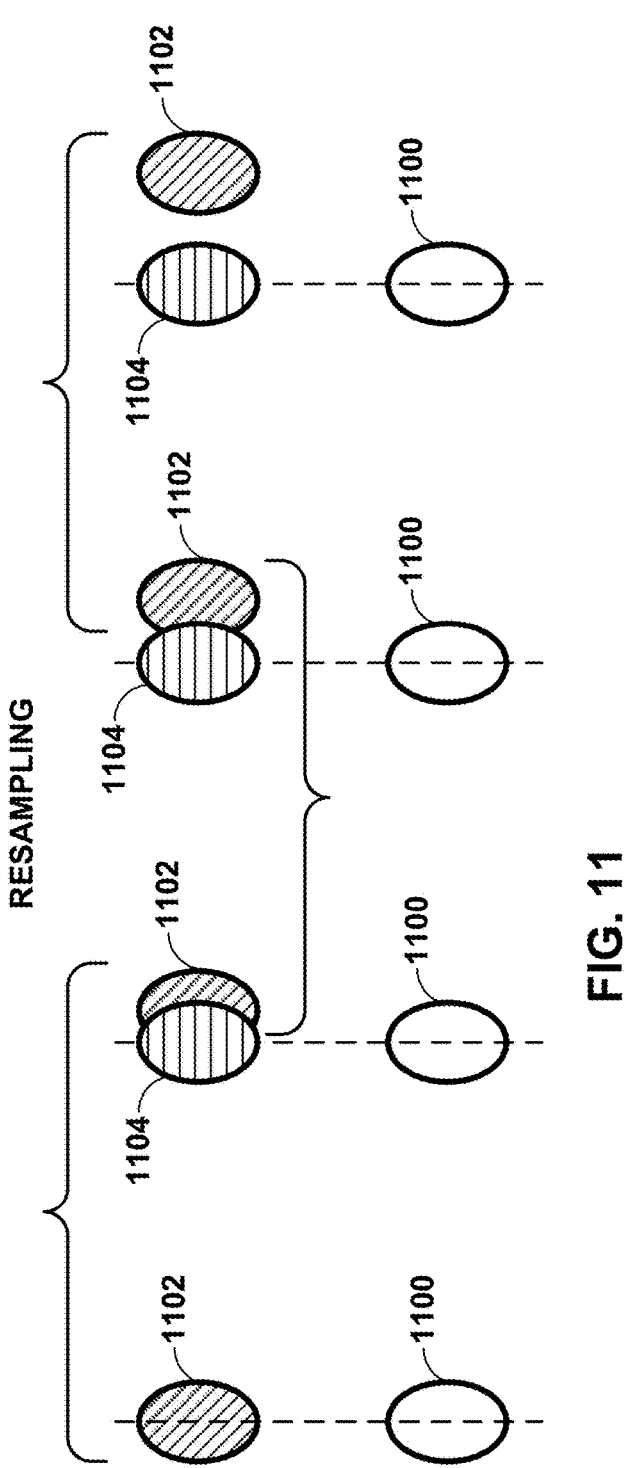
FIG. 11

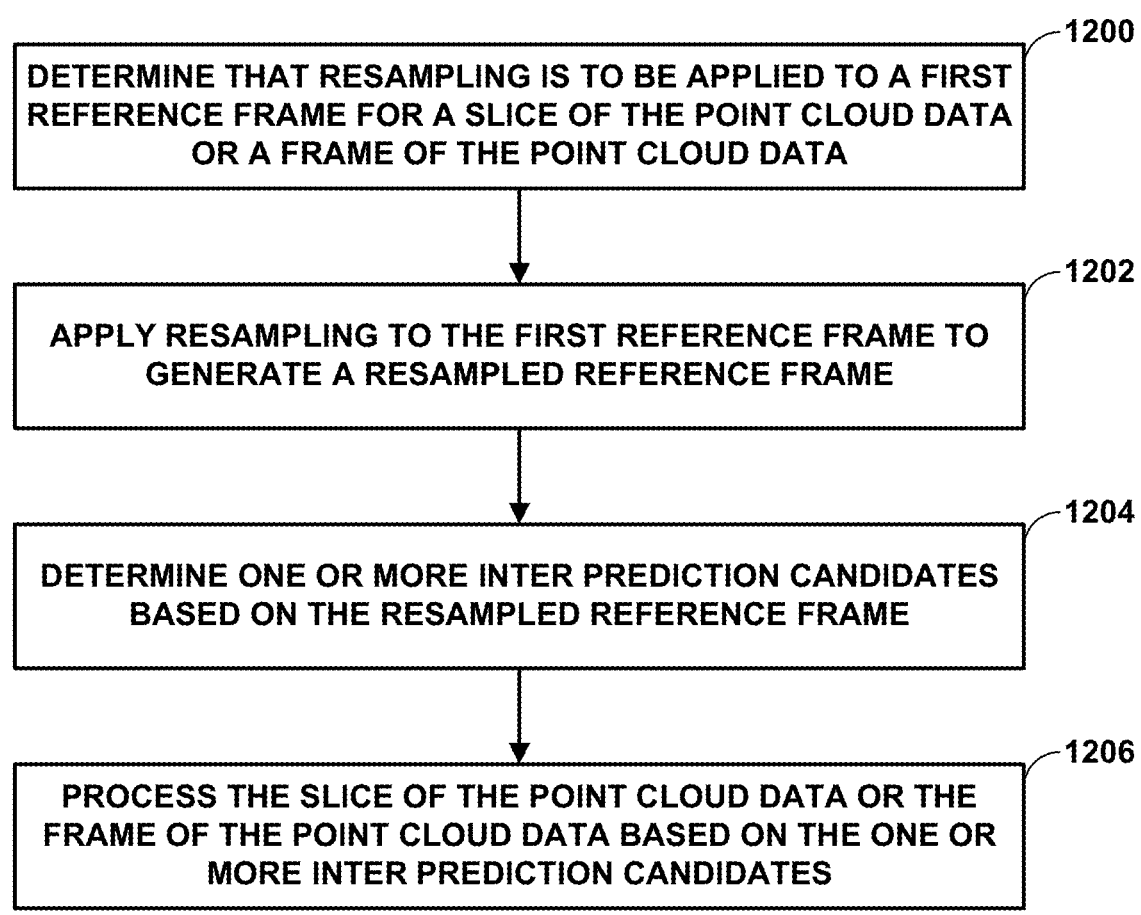

┌─ 1200

DETERMINE THAT RESAMPLING IS TO BE APPLIED TO A FIRST REFERENCE FRAME FOR A SLICE OF THE POINT CLOUD DATA OR A FRAME OF THE POINT CLOUD DATA

┌─ 1202

APPLY RESAMPLING TO THE FIRST REFERENCE FRAME TO GENERATE A RESAMPLED REFERENCE FRAME

┌─ 1204

DETERMINE ONE OR MORE INTER PREDICTION CANDIDATES BASED ON THE RESAMPLED REFERENCE FRAME

┌─ 1206

PROCESS THE SLICE OF THE POINT CLOUD DATA OR THE FRAME OF THE POINT CLOUD DATA BASED ON THE ONE OR MORE INTER PREDICTION CANDIDATES

FIG. 12

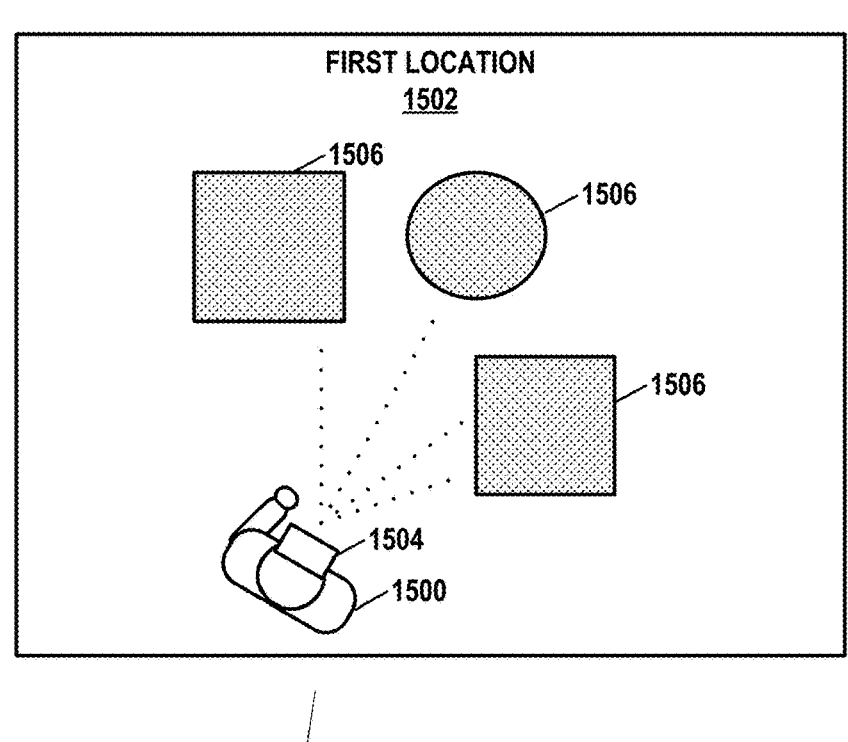
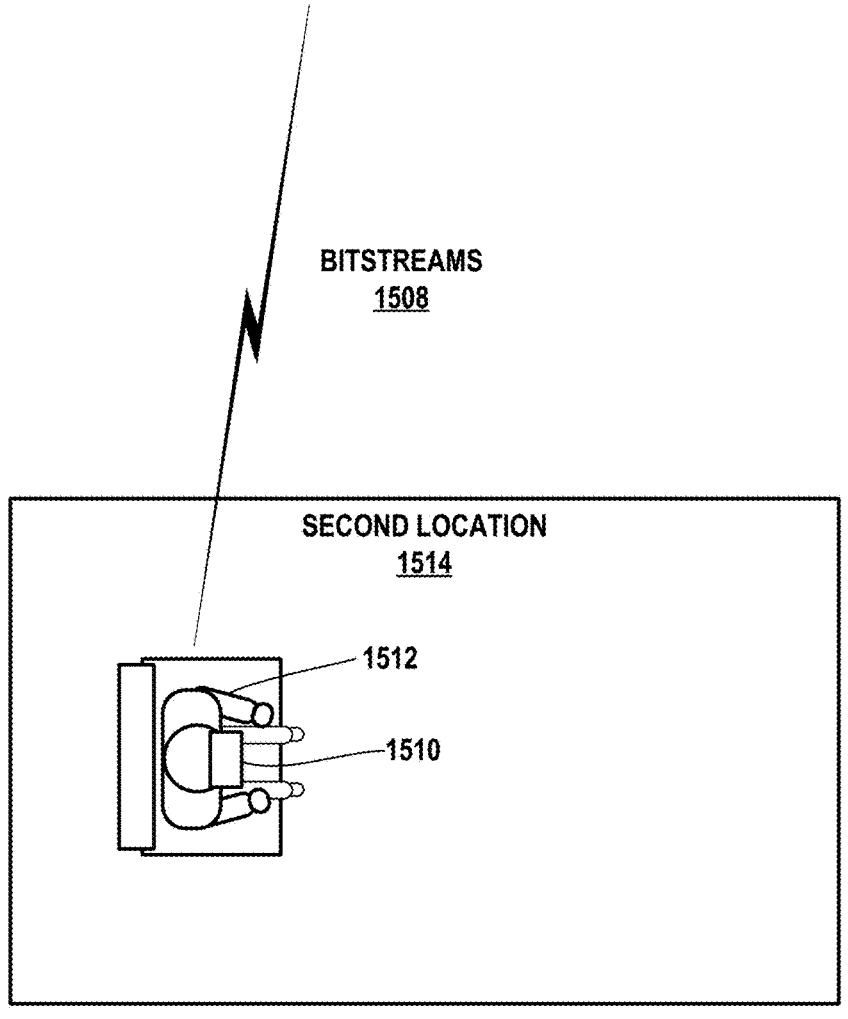
FIG. 15

INTER PREDICTION FOR PREDICTIVE GEOMETRY CODING

This application claims the benefit of U.S. Provisional Patent Application 63/479,336, filed Jan. 10, 2023, the entire content of which is hereby incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for inter prediction for predictive geometry coding of point clouds. Resampling is beneficial for some point cloud sequences, whereas for other sequences, resampling may not be beneficial. To always enable resampling for all sequences, or always disable resampling for all sequences, may result in sub-optimal coding performance overall. As such, it may be beneficial to not always enable or always disable resampling.

Additionally, when global motion compensation is not applied for a particular slice or frame (or there is no motion, e.g., no rotation or translation), there may be no difference between the zero-motion compensated frame and the global-motion-compensated frame. Including both zero-motion-compensated and global-motion-compensated candidates in the inter predictor list causes inefficiency in coding the inter predictor candidate index. Therefore, it may be desirable to avoid including both zero-motion-compensated and global-motion-compensated candidates in the inter predictor list when there may is no difference between the zero-motion compensated frame and the global-motion-compensated frame.

In one example, this disclosure describes a method of processing point cloud data including determining that resampling is to be applied to a first reference frame for a slice of the point cloud data or a frame of the point cloud data; applying resampling to the first reference frame to generate a resampled reference frame; determining one or more inter prediction candidates based on the resampled reference frame; and processing the slice of the point cloud data or the frame of the point cloud data based on the one or more inter prediction candidates.

In another example, this disclosure describes a device for processing point cloud data including one or more memories configured to store point cloud data; and one or more processors implemented in circuitry and communicatively coupled to the one or more memories, the one or more processors being configured to: determine that resampling is to be applied to a first reference frame for a slice of the point cloud data or a frame of the point cloud data; apply resampling to the first reference frame to generate a resampled reference frame; determine one or more inter prediction candidates based on the resampled reference frame; and process the slice of the point cloud data or the frame of the point cloud data based on the one or more inter prediction candidates.

In another example, this disclosure describes a device for processing point cloud data including means for determining that resampling is to be applied to a first reference frame for a slice of the point cloud data or a frame of the point cloud data; means for applying resampling to the first reference frame to generate a resampled reference frame; means for determining one or more inter prediction candidates based on the resampled reference frame; and means for processing the slice of the point cloud data or the frame of the point cloud data based on the one or more inter prediction candidates.

In another example, this disclosure describes computer-readable storage media having stored thereon instructions that, when executed, cause one or more processors to determine that resampling is to be applied to a first reference frame for a slice of point cloud data or a frame of the point cloud data; apply resampling to the first reference frame to generate a resampled reference frame; determine one or more inter prediction candidates based on the resampled reference frame; and process the slice of the point cloud data or the frame of the point cloud data based on the one or more inter prediction candidates.

The details of one or more examples are set forth in the accompanying drawings and the description below. Other features, objects, and advantages will be apparent from the description, drawings, and claims.

BRIEF DESCRIPTION OF DRAWINGS

FIG. 11 is a conceptual diagram illustrating an example of azimuth resampling of motion compensated references.

FIG. 12 is a flow diagram illustrating example resampling techniques according to one or more aspects of this disclosure.

FIG. 15 is a conceptual diagram illustrating an example extended reality system in which one or more techniques of this disclosure may be used.

DETAILED DESCRIPTION

Resampling (which is discussed hereinafter) is beneficial for some point cloud sequences, whereas for other sequences, resampling may not be beneficial. To always enable resampling for all sequences, or always disable resampling for all sequences may result in sub-optimal coding performance overall. As such, it may be beneficial to not always enable or disable resampling.

Additionally, when global motion compensation is not applied for a particular slice or frame (or there is no motion, e.g., no rotation or translation), there may be no difference between the zero-motion compensated frame and the global-motion-compensated frame. Therefore, including both zero-motion-compensated and global-motion-compensated candidates in the inter predictor list causes inefficiency in coding the inter predictor candidate index. As such, it may be desirable to avoid including both zero-motion-compensated and global-motion-compensated candidates in the inter predictor list when there is no difference between the zero-motion compensated frame and the global-motion-compensated frame.

Figure 1:
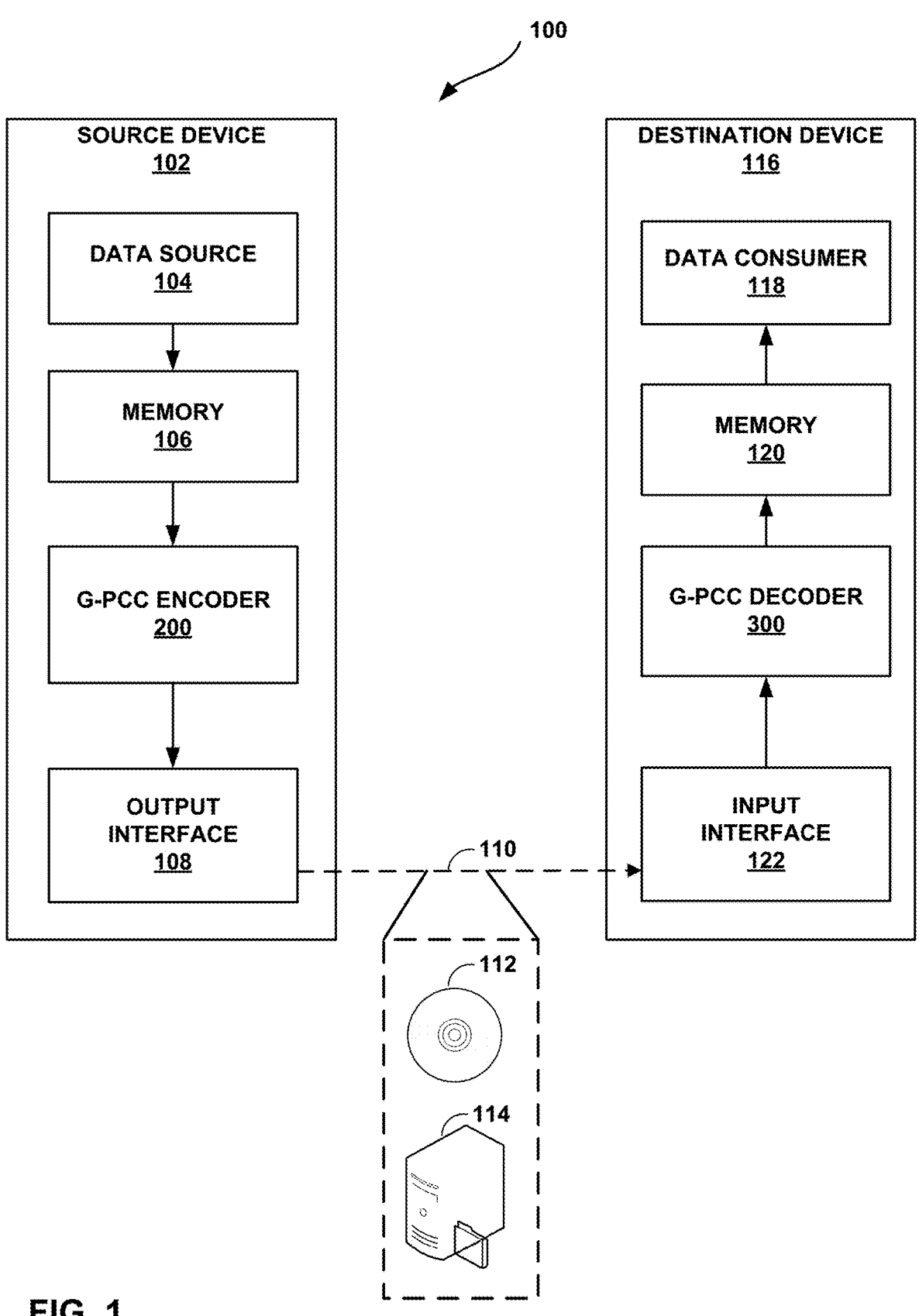
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via computer-readable media 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to inter prediction for predictive geometry coding. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to inter prediction for predictive geometry coding. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable media 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable media 110 may represent one or more of any type of medium or device capable of transporting the encoded data from source device 102 to destination device 116. In one example, computer-readable media 110 represents communication media to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable media 110 (e.g., one or more communication media, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11), and more recently ISO/IEC MPEG 3DG (JTC 1/SC29/WG 7), are studying the potential need for standardization of point cloud coding technology with a compression capability that significantly exceeds that of the current approaches and will target to create the standard. MPEG is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in ISO/IEC FDIS 23090-9 Geometry-based Point Cloud Compression, ISO/IEC JTC 1/SC29/WG 7 m55637, Teleconference, October 2020, and a description of the codec is available in G-PCC 2nd Edition Codec Description, ISO/IEC JTC 1/SC29/WG 7 MDS21684, Teleconference, July 2022.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
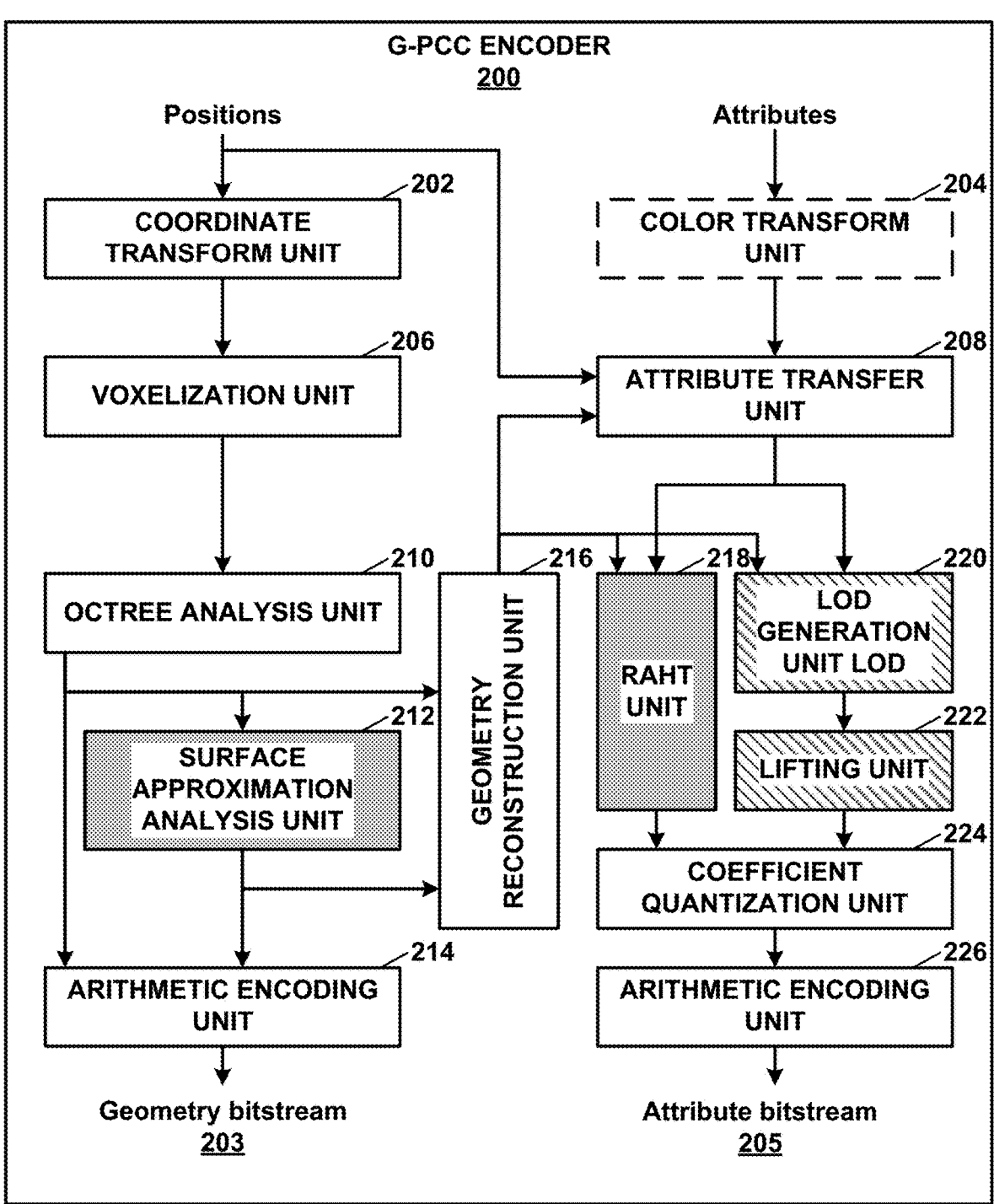
FIG. 2 is a block diagram illustrating an example Geometry Point Cloud Compression (G-PCC) encoder.
Figure 3:
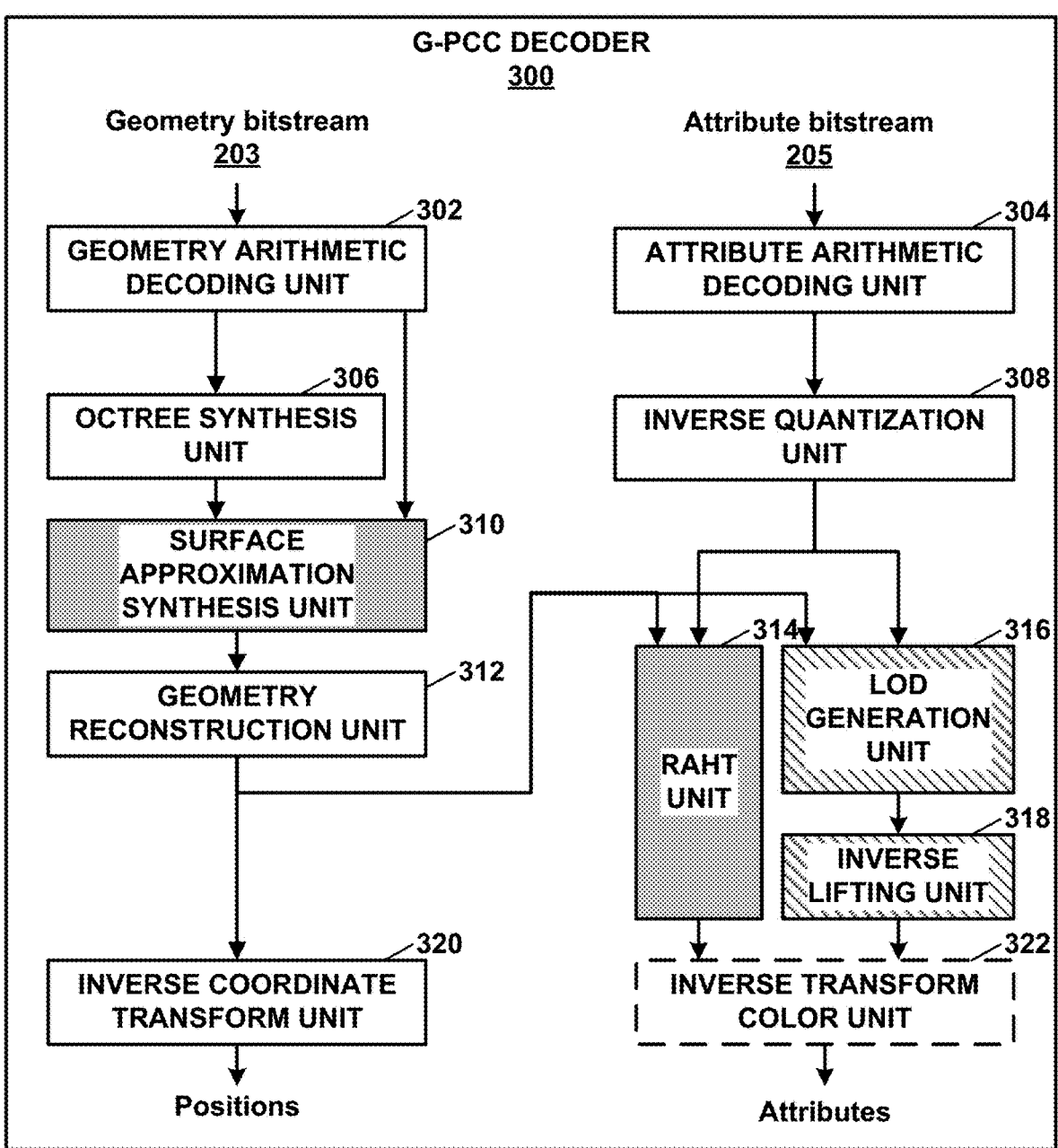
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For geometry coding, two different types of coding techniques exist: Octree and predictive-tree coding. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Figure 4:
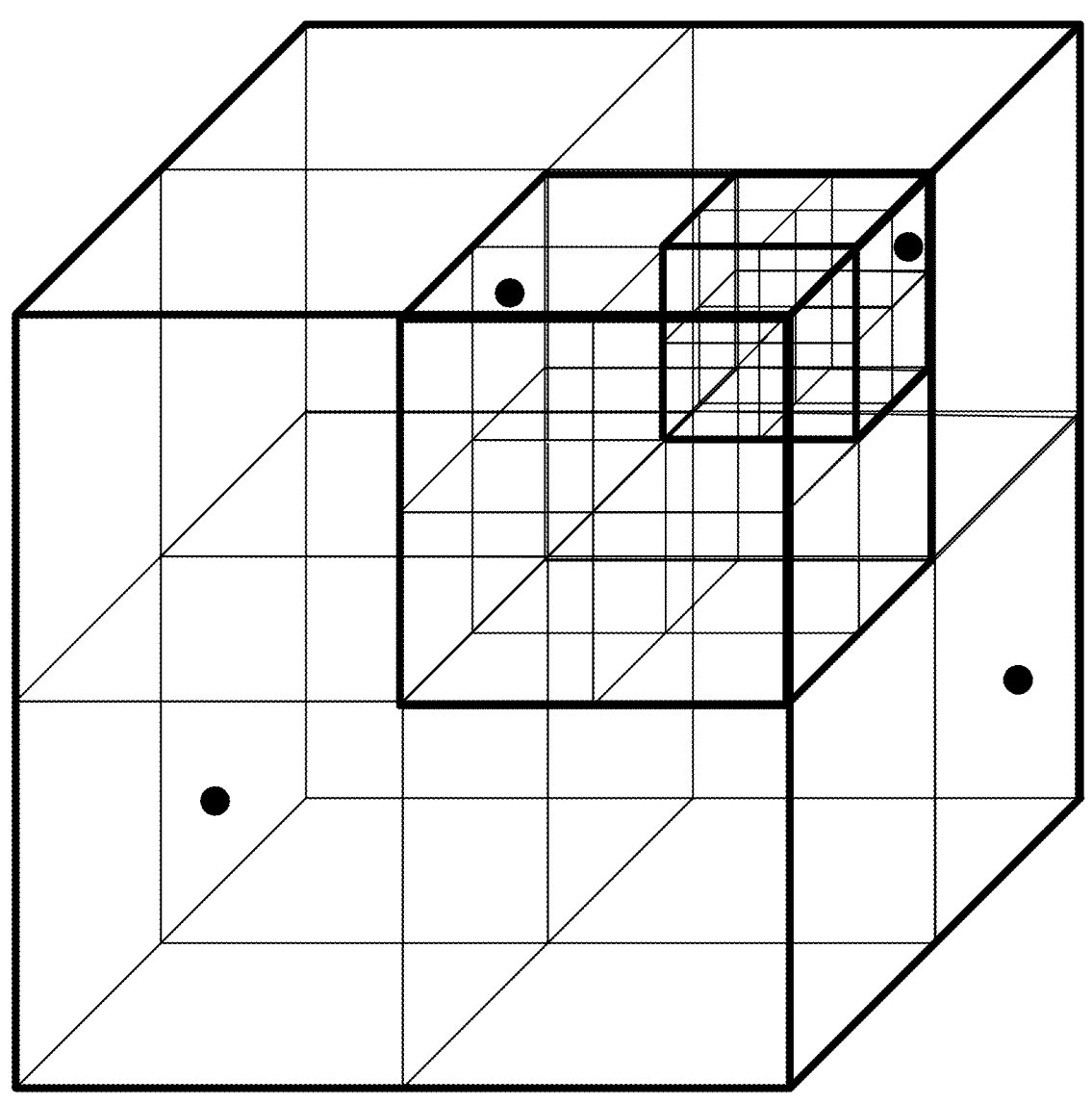
FIG. 4 is an example Octree split for geometry coding according to the techniques of this disclosure.

FIG. 4 is an example Octree split for geometry coding according to the techniques of this disclosure.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse transform color unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 5:
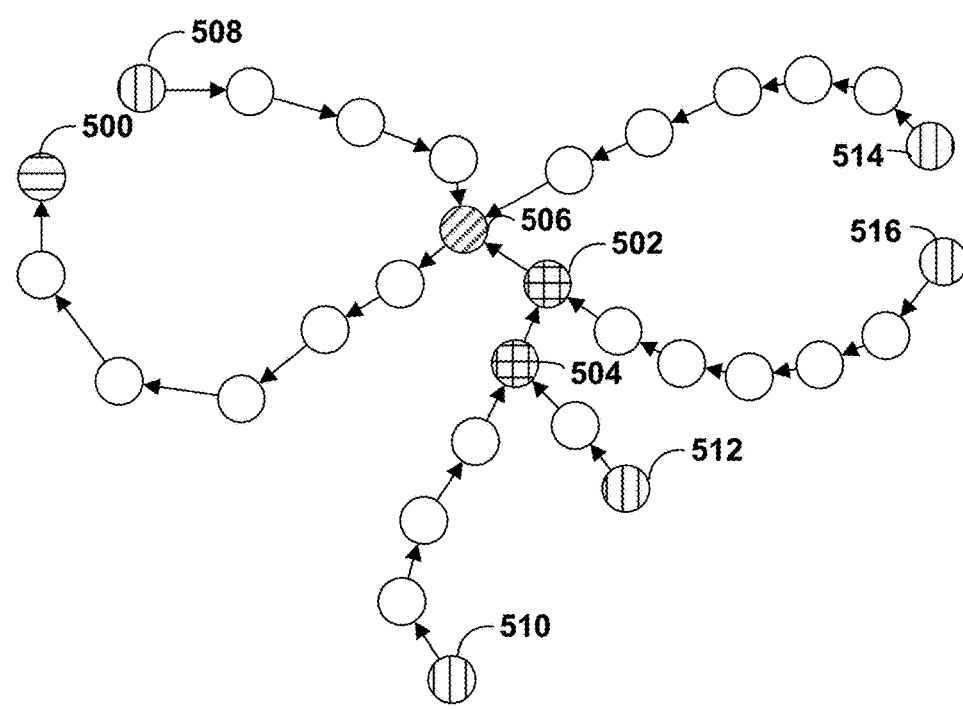
FIG. 5 is a conceptual diagram illustrating an example of a prediction tree, in accordance with one or more techniques of this disclosure.

Predictive geometry coding (see G-PCC $2^{nd}$ Edition Codec Description, ISO/IEC JTC 1/SC29/WG 7 MDS21684, Teleconference, July 2022) was introduced as an alternative to the octree geometry coding, where the nodes are arranged in a tree structure (which defines the prediction structure), and various prediction strategies are used to predict the coordinates of each node in the tree with respect to its predictors. FIG. 5 shows an example of a prediction tree, a directed graph where the arrow point to the prediction direction. The horizontal-hashed node is the root vertex and has no predictors; the crosshatched nodes have two children; the diagonal-hashed node has 3 children; the non-hashed nodes have one child and the vertical-hashed nodes are leaf nodes and these have no children. Every node, aside from the root node, has only one parent node.

FIG. 5 is a conceptual diagram illustrating an example of a prediction tree. Node 500 is the root vertex and has no predictors. Nodes 502 and 504 have two children. Node 506 has 3 children. Nodes 508, 510, 512, 514, and 516 are leaf nodes and these have no children. The remaining nodes each have one child. Every node aside from root node 500 has only one parent node.

Four prediction strategies are specified for each node based on its parent (p0), grand-parent (p1) and great-grand-parent (p2):

No prediction/zero prediction (0)

Delta prediction ($p0$)

Linear prediction ($2 * p0 - p1$)

Parallelogram prediction ($p0 + p1 - p2$)

G-PCC encoder 200 may employ any algorithm to generate the prediction tree; the algorithm used may be determined based on the application/use case and several strategies may be used. Some strategies are described in the G-PCC 2nd Edition Codec Description, ISO/IEC JTC 1/SC29/WG 7 MDS21684, Teleconference, July 2022.

For each node, the residual coordinate values are coded in the bitstream starting from the root node in a depth-first manner. For example, G-PCC encoder 200 may code the residual coordinate values in the bitstream.

For each node, the residual coordinate values are coded in the bitstream starting from the root node in a depth-first manner. For example, G-PCC encoder 200 may code the residual coordinate values in the bitstream.

Predictive geometry coding is useful mainly for Category 3 (LIDAR-acquired) point cloud data, e.g., for low-latency applications.

Figure 6A:
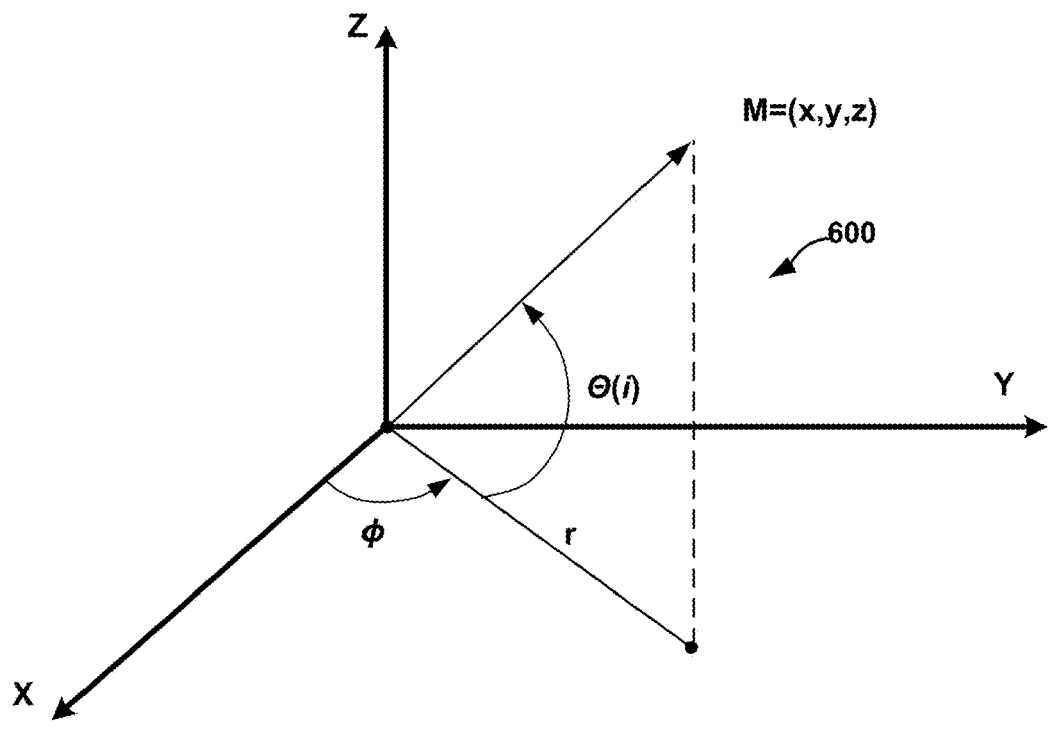
FIGS. 6A and 6B are conceptual diagrams illustrating an example of a spinning Light Detection and Ranging (LIDAR) acquisition model, in accordance with one or more techniques of this disclosure.
Figure 6B:
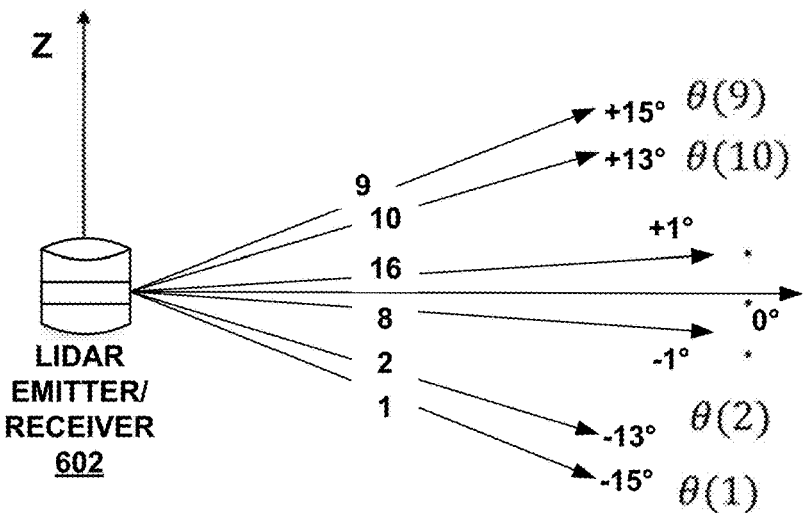

FIGS. 6A and 6B are conceptual diagrams illustrating an example of a spinning LIDAR acquisition model. Angular mode for predictive geometry coding is now described. Angular mode may be used in predictive geometry coding, where the characteristics of LIDAR sensors may be utilized in coding the prediction tree more efficiently. The coordinates of the positions are converted to the (r, $\phi$, i) (radius, azimuth and laser index) domain 600 and a prediction is performed in this domain 600 (e.g., the residuals are coded in r, $\phi$, i domain). Due to the errors in rounding, coding in r, $\phi$, i is not lossless and hence a second set of residuals may be coded which correspond to the Cartesian coordinates. A description of the encoding and decoding strategies used for angular mode for predictive geometry coding is reproduced below from the G-PCC Codec Description.

The angular mode technique may focus on point clouds acquired using a spinning LIDAR model. Here, LIDAR 602 has N lasers (e.g., N=16, 32, 64) spinning around the Z axis according to an azimuth angle $\phi$. Each laser may have different elevation $\theta(i)_{i=1 \ldots N}$ and height $\varsigma(i)_{i=1 \ldots N}$. For example, the laser i may hit a point M, with cartesian integer coordinates (x, y, z), defined according to the coordinate system shown in FIGS. 6A-6B.

This technique models the position of M with three parameters (r, $\phi$, i), which are computed as follows:

$$r = \sqrt{x^2 + y^2}$$

$$\phi = a\tan2(y, x)$$

$$i = \arg \min_{j=1 \ldots N} \{z + \varsigma(j) - r \times \tan(\theta(j))\},$$

More precisely, the technique uses the quantized version of (r, $\phi$, i), denoted ($\tilde{r}$, $\tilde{\phi}$, i), where the three integers $\tilde{r}$, $\tilde{\phi}$ and i are computed as follows:

$$\tilde{r} = \text{floor}\left(\frac{\sqrt{x^2 + y^2}}{q_r} + o_r\right) = hypot(x, y)$$

$$\tilde{\phi} = \text{sign}(a\tan2(y, x)) \times \text{floor}\left(\frac{|a\tan2(y, x)|}{q_\phi} + o_\phi\right)$$

$$i = \arg \min_{j=1 \ldots N} \{z + \varsigma(j) - r \times \tan(\theta(j))\}$$

where ($q_r$, $o_r$) and ($q_\phi$, $o_\phi$) are quantization parameters controlling the precision of $\tilde{\phi}$ and $\tilde{r}$, respectively. sign(t) is a function that returns 1 if t is positive and (−1) otherwise. |t| is the absolute value of t.

To avoid reconstruction mismatches due to the use of floating-point operations, the values of $\varsigma(i)_{i=1 \ldots N}$ and $\tan(\theta(i))_{i=1 \ldots N}$ are pre-computed and quantized as follows:

$$\tilde{z}(i) = \text{sign}(\varsigma(i)) \times \text{floor}\left(\frac{|\varsigma(i)|}{q_\varsigma} + o_\varsigma\right)$$

$$\tilde{t}(i) = \text{sign}(\varsigma(\tan(\theta(j)))) \times \text{floor}\left(\frac{|\tan(\theta(j))|}{q_\theta} + o_\theta\right)$$

where ($q_\varsigma$, $o_\varsigma$) and ($q_\theta$, $o_\theta$) are quantization parameters controlling the precision of $\varsigma$ and $\tilde{\theta}$, respectively.

The reconstructed cartesian coordinates are obtained as follows:

$$\hat{x} = \text{round}(\tilde{r} \times q_r \times \text{app\_cos}(\tilde{\phi} \times q_\phi))$$

$$\hat{y} = \text{round}(\tilde{r} \times q_r \times \text{app\_sin}(\tilde{\phi} \times q_\phi))$$

$$\hat{z} = \text{round}(\tilde{r} \times q_r \times \tilde{t}(i) \times q_\theta - \tilde{z}(i) \times q_\varsigma),$$

where app_cos($\cdot$) and app_sin($\cdot$) are approximations of cos ($\cdot$) and sin($\cdot$). The calculations could be performed using a fixed-point representation, a look-up table, and/or linear interpolation.

Note that ($\hat{x}$, $\hat{y}$, $\hat{z}$) may be different from (x, y, z) due to various reasons, such as quantization, approximations, model imprecision, model parameters imprecisions, or the like.

($r_x$, $r_y$, $r_z$) can be the reconstruction residuals defined as follows:

$$r_x = x - \hat{x}$$

$$r_y = y - \hat{y}$$

$$r_z = z - \hat{z}$$

With this technique, G-PCC encoder 200 may proceed as follows:

1) Encode the model parameters $\tilde{t}(i)$ and $\tilde{z}(i)$ and the quantization parameters $q_r$ $q_\varsigma$, $q_\theta$ and $q_\phi$ 2) Apply the geometry predictive scheme described in the text of ISO/IEC FDIS 23090-9 Geometry-based Point Cloud Compression, ISO/IEC JTC 1/SC29/WG 7 m55637, Teleconference, October 2020, to the representation ($\tilde{r}$, $\tilde{\phi}$, i).

A new predictor leveraging the characteristics of LIDAR may be introduced. For instance, the rotation speed of the LIDAR scanner around the z-axis is usually constant. Therefore, G-PCC encoder 200 could predict the current $\tilde{\phi}(j)$ as follows:

$$\tilde{\phi}(j) = \tilde{\phi}(j-1) + n(j) \times \delta_\phi(k)$$

Where $(\delta_\phi(k))_{k=1 \ldots K}$ is a set of potential speeds G-PCC encoder 200 may use. The index k may be explicitly written to a bitstream or may be inferred from the context based on a deterministic strategy applied by both G-PCC encoder 200 and G-PCC decoder 300, and n(j) is the number of skipped points which may be explicitly written to the bitstream or may be inferred from the context based on a deterministic strategy applied by both G-PCC encoder 200 and G-PCC decoder 300. n(j) is also referred to as a "phi multiplier" herein. Note, the phi multiplier is currently used only with the delta predictor.

3) Encode with each node the reconstruction residuals ($r_x$, $r_y$, $r_z$)

G-PCC decoder 300 may proceed as follows:

1) Decode the model parameters $\tilde{t}(i)$ and $\tilde{z}(i)$ and the quantization parameters $q_r$, $q_\varsigma$, $q_\theta$ and $q_\phi$ 2) Decode the ($\tilde{r}$, $\tilde{\phi}$, i) parameters associated with the nodes according to the geometry predictive scheme described in the text of ISO/IEC FDIS 23090-9 Geometry-based Point Cloud Compression, ISO/IEC JTC 1/SC29/WG 7 m55637, Teleconference, October 2020.

3) Compute the reconstructed coordinates ($\hat{x}$, $\hat{y}$, $\hat{z}$) as described above 4) Decode the residuals ($r_x$, $r_y$, $r_z$)

As discussed in the next section, lossy compression could be supported by quantizing the reconstruction residuals ($r_x$, $r_y$, $r_z$)

5) Compute the original coordinates (x, y, z) as follows $$x = r_x + \hat{x}$$

$$y = r_y + \hat{y}$$

$$z = r_z + \hat{z}$$

Lossy compression may be achieved by applying quantization to the reconstruction residuals ($r_x$, $r_y$, $r_z$) or by dropping points.

The quantized reconstruction residuals may be computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_y} + o_y\right)$$

$$\tilde{r}_z = \text{sign}(r_z) \times \text{floor}\left(\frac{|r_z|}{q_z} + o_z\right)$$

Where ($q_x$, $o_x$), ($q_y$, $o_y$) and ($q_z$, $o_z$) are quantization parameters controlling the precision of $\tilde{r}_y$, $\tilde{r}_y$ and $\tilde{r}_z$, respectively. For example, G-PCC encoder 200 or G-PCC decoder 300 may compute the quantized residuals.

G-PCC encoder 200 or G-PCC decoder 300 may use trellis quantization to further improve the RD (rate-distortion) performance results.

The quantization parameters may change at sequence/frame/slice/block level to achieve region adaptive quality and/or for rate control purposes.

Inter prediction in G-PCC predictive geometry coding is now discussed. Information regarding G-PCC predictive geometry coding may be found in Technologies under consideration in G-PCC, ISO/IEC JTC 1/SC29/WG 7 MDS20999, Teleconference, October 2021; A. K. Ramasubramonian, L. Pham Van, G. Van der Auwera, M. Karczewicz, [G-PCC] EE13.2 report on inter prediction, Test 2, ISO/IEC JTC1/SC29/WG7 m56839, April 2021; and A. K. Ramasubramonian, G. Van der Auwera, L. Pham Van, M. Karczewicz, [G-PCC][EE13.2-related] Additional results for inter prediction for predictive geometry, ISO/IEC JTC1/SC29/WG7 m56841, April 2021.

Predictive geometry coding uses a prediction tree structure to predict the positions of points. When angular coding is enabled, the x, y, z coordinates are transformed to radius, azimuth, and laserID and residuals may be signaled in these three coordinates as well as in the x, y, z dimensions. The intra prediction used for radius, azimuth, and laserID may be one of four modes and the predictors are nodes that may be classified as parent, grand-parent, and great-grandparent in the prediction tree with respect to the current node. The predictive geometry coding, as designed in G-PCC Ed.1, is an intra coding tool that only uses points in the same frame for prediction. Additionally, using points from previously decoded frames may provide a better prediction and thus better compression performance.

For inter prediction, as initially proposed in Technologies under consideration in G-PCC, ISO/IEC JTC 1/SC29/WG 7 MDS20999, Teleconference, October 2021; and A. K. Ramasubramonian, L. Pham Van, G. Van der Auwera, M. Karczewicz, [G-PCC] EE13.2 report on inter prediction, Test 2, ISO/IEC JTC1/SC29/WG7 m56839, April 2021, predicting the radius of a point from a reference frame was described. For each point in the prediction tree, G-PCC decoder 300 may determine whether the point is inter predicted or intra predicted (e.g., G-PCC encoder 200 may indicate such inter prediction or intra prediction through the value of a flag which G-PCC encoder 200 may signal in the bitstream and G-PCC decoder 300 may parse to determine the value indicative of whether the point is inter predicted or intra predicted). When intra predicted, the intra prediction modes of predictive geometry coding are used. When inter prediction is used, the azimuth and laserID are still predicted with intra prediction, while the radius is predicted from the point in a reference frame that has the same laserID as the current point and an azimuth that is closest to the current azimuth. A further change to this technique was set forth in A. K. Ramasubramonian, G. Van der Auwera, L. Pham Van, M. Karczewicz, [G-PCC][EE13.2-related] Additional results for inter prediction for predictive geometry, ISO/IEC JTC1/SC29/WG7 m56841, April 2021, which describes enabling inter prediction of the azimuth and laserID in addition to radius prediction. In this example, when inter coding is applied, the radius, azimuth and laserID of the current point are predicted based on a point that is near the azimuth position of a previously decoded point in the reference frame. In addition, separate sets of contexts are used for inter and intra prediction.

Figure 7:
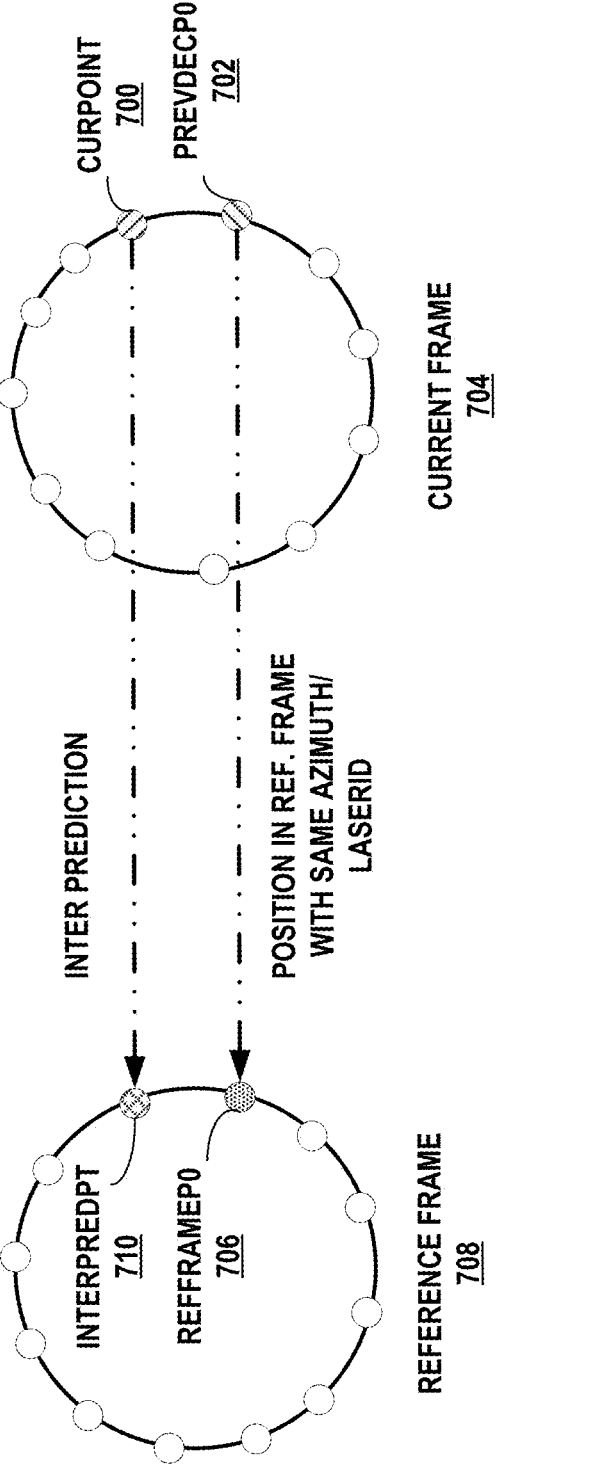
FIG. 7 is a conceptual diagram illustrating an example of inter-prediction of a current point from a point in a reference frame, in accordance with one or more techniques of this disclosure.

FIG. 7 is a conceptual diagram illustrating an example of inter-prediction of a current point from a point in a reference frame. The extension of inter prediction to azimuth, radius, and laserID includes the following steps which, for example, may be performed by G-PCC decoder 300:

1) For a given point (e.g., the current point curPoint 700 in current frame 704), choose the previous decoded point (prevDecPO 702).
2) Choose a position (e.g., refFramePO 706) in reference frame 708 that has same scaled azimuth and laserID as prevDecPO 702.
3) In reference frame 708, find the first point (interPredPt 710) that has azimuth greater than that of refFramePO 706. The interPredPt may also be referred to as the "Next" inter predictor.

Figure 8:
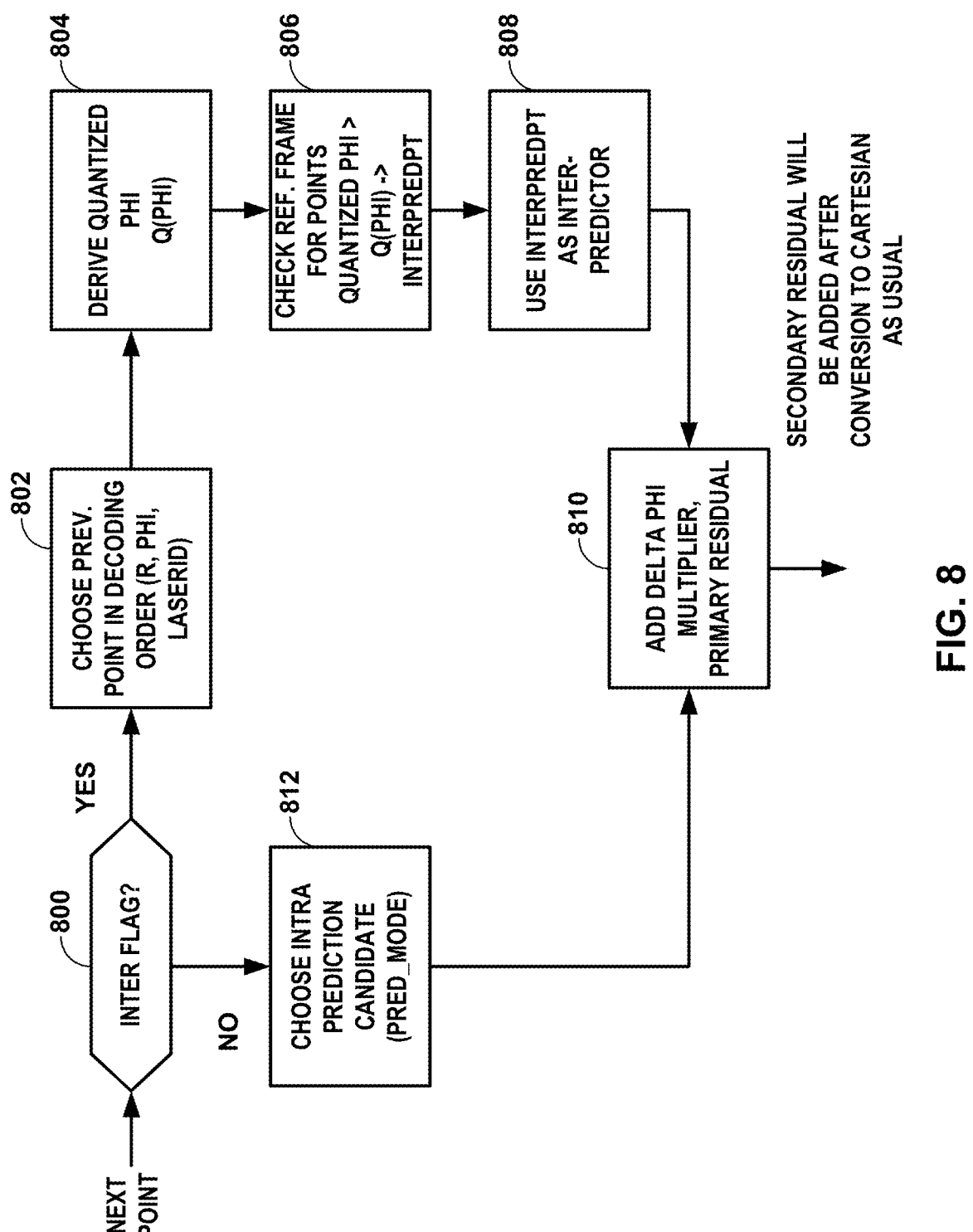
FIG. 8 is a flow diagram illustrating operation of a G-PCC decoder, in accordance with one or more techniques of this disclosure.

FIG. 8 is a flow diagram illustrating operation of a G-PCC decoder. FIG. 8 illustrates the decoding flow associated with the "inter_flag" that is signalled for every point. The technique is available in InterEM-v3.0.

For example, G-PCC decoder 300 may determine whether the inter flag is true (e.g., equal to 1) (800). If the inter flag is true (the "YES" path from block 800), G-PCC decoder 300 may choose a previous decoded point in decoding order using radius, azimuth, and laserID (802). G-PCC decoder 300 may derive a quantized phi, Q(phi) (e.g., a quantized value of the azimuth) of the chosen previous decoded point (e.g., prevDecPO 702) (804). G-PCC decoder 300 may check the reference frame (e.g., reference frame 708 of FIG. 7) for points where the quantized phi of such points is greater than Q(phi) which may lead to interPredPt 710 (806). G-PCC decoder 300 may then use interPredPt 710 as an inter-predictor for the current point, curPoint 700 (808). G-PCC decoder 300 may then add a delta phi multiplier, e.g., n(j)×δ_φ(k) as discussed above, to the primary residual (810).

If the inter flag is false (e.g., is equal to 0) (the "NO" path from block 800), G-PCC decoder 300 may choose an intra prediction candidate (812) and apply intra prediction. G-PCC decoder 300 may then add a delta phi multiplier to yield the primary residual (810).

Figure 9:
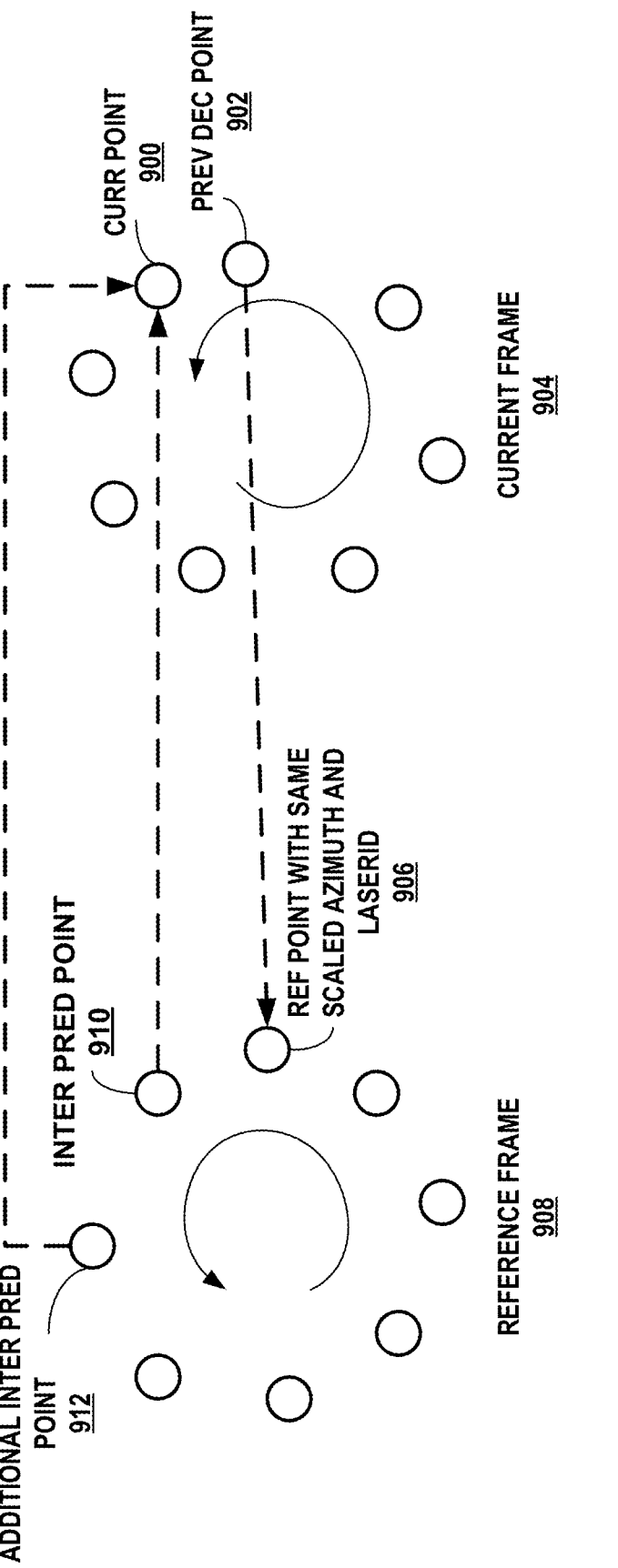
FIG. 9 is a conceptual diagram illustrating an example of an additional inter predictor point obtained from the first point that has an azimuth greater than the inter predictor point, in accordance with one or more techniques of this disclosure.

FIG. 9 is a conceptual diagram illustrating an example of an additional inter predictor point obtained from the first point that has an azimuth greater than the inter predictor point. An additional predictor candidate is now discussed. Information relating to the additional predictor candidate may be found in K. L. Loi. T. Nishi, T. Sugio, [G-PCC] [New] Inter Prediction for Improved Quantization of Azimuthal Angle in Predictive Geometry Coding, ISO/IEC JTC1/SC29/WG7 m57351, July 2021. In the inter prediction technique for predictive geometry described above, the radius, azimuth, and laserID of the current point are predicted based on a point that is near the collocated azimuth position in the reference frame when inter coding is applied, for example, by G-PCC decoder 300, using the following steps:

1) for a given point (e.g., a current point, Curr Point 900), choose the previous decoded point (e.g., Prev Dec Point 902) of current frame 904,
2) choose a position (e.g., Ref Point 906) in reference frame 908 that has the same scaled azimuth and laserID as the previous decoded point (e.g., Prev Dec Point 902),
3) choose a position (Inter Pred Point 910) in reference frame 908 from the first point that has azimuth greater than the position in reference frame 908 that has the same scaled azimuth and laserID as the previous decoded point (e.g., Prev Dec Point 902), to be used as the inter predictor point.

This technique adds an additional inter predictor point 912 that is obtained by finding the first point that has an azimuth greater than the inter predictor point (e.g., Inter Pred Point 910) as shown in FIG. 9. Additional signaling is used to indicate which of the predictors is selected if inter coding has been applied by G-PCC encoder 200. For example, G-PCC encoder 200 may signal to G-PCC decoder 300 which of the predictors is selected. The additional inter predictor point may also be referred to as the "NextNext" inter predictor.

Inter prediction flag coding is now discussed. Information regarding such inter prediction flag coding may be found in A. K. Ramasubramonian, L. Pham Van, G. Van der Auwera, M. Karczewicz, [G-PCC][New proposal] Improvements to inter prediction using predictive geometry coding. ISO/IEC JTC1/SC29/WG7 m57299, July 2021. A context selection algorithm may be applied for coding the inter prediction flag. G-PCC encoder 200 may use the inter prediction flag values of the five previously coded points to select the context of the inter prediction flag in predictive geometry coding.

Global motion compensation is now described. When global motion (GM) parameters are available, inter prediction may be applied using a reference frame that is motion compensated using the GM parameters, as described in A. K. Ramasubramonian, G. Van der Auwera, L. Pham Van, M. Karczewicz, [G-PCC][New proposal] Results on inter prediction for predictive geometry coding, ISO/IEC JTC1/SC29/WG7 m59650, April 2022. The GM parameters may include rotation parameters and/or translation parameters. Typically, G-PCC encoder 200 or G-PCC decoder 300 may apply global motion compensation in the Cartesian domain. In some cases G-PCC encoder 200 or G-PCC decoder 300 may apply global motion compensation in the spherical domain. Depending on which domain the reference frame is stored, and which domain the reference frame is compensated, one or more of Cartesian to spherical domain conversion techniques, or spherical to Cartesian domain conversion techniques may be applied, for example, by G-PCC encoder 200 or G-PCC decoder 300.

Figure 10:
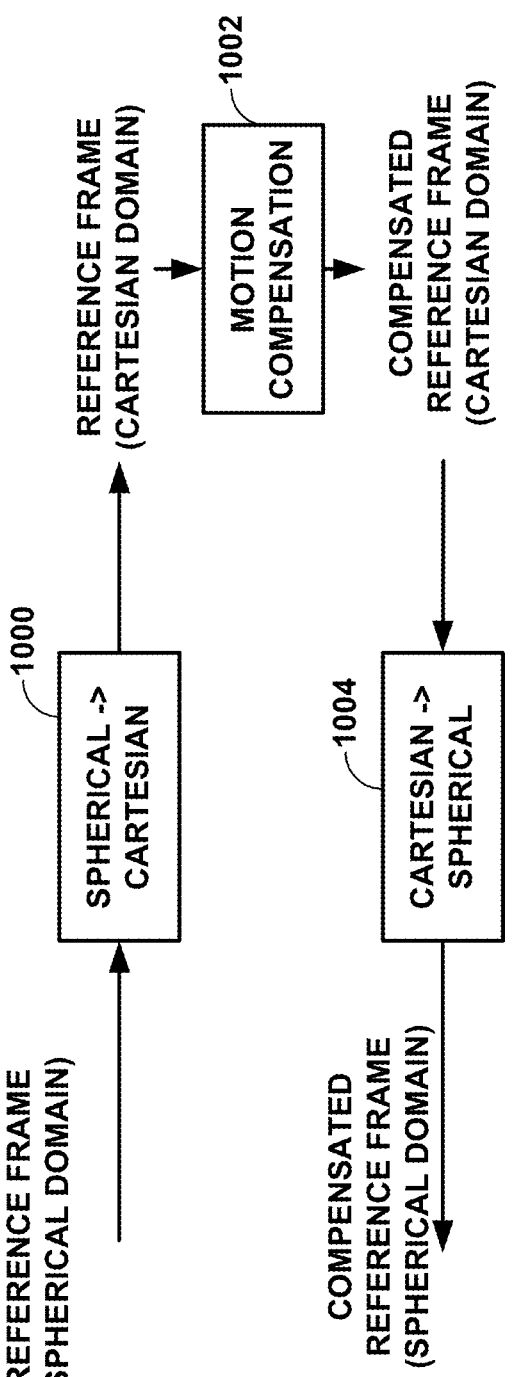
FIG. 10 is a flow diagram illustrating an example of motion compensation techniques where the reference frame is in the spherical domain and the motion compensation is applied in the Cartesian domain.

FIG. 10 is a flow diagram illustrating an example of motion compensation techniques where the reference frame is in the spherical domain and the motion compensation is applied in the Cartesian domain. For example, when the reference frame is stored in spherical domain, and the motion compensation is performed in the Cartesian domain, the motion compensation process may involve one or more of the steps shown in FIG. 10. In such cases, the compensated reference frame may be used for inter prediction.

For example, G-PCC encoder 200 or G-PCC decoder 300 may convert a reference frame from the spherical domain to the Cartesian domain (1000). G-PCC encoder 200 or G-PCC decoder 300 may apply motion compensation to the converted reference frame in the Cartesian domain (1002). G-PCC encoder 200 or G-PCC decoder 300 may convert the compensated reference frame from the Cartesian domain to the spherical domain (1004).

For example, given a position (x, y, z) in the Cartesian coordinate system, the corresponding radius and azimuthal angle may be calculated (e.g., using a floating point implementation) as follows (As a CartesianToSpherical conversion function):

$$\text{int64\_t } r0 = \text{int64\_t}(std::round(hypot(xyz[0], xyz[1])));$$

$$\text{auto } phi0 = std::round((atan2(xyz[1], xyz[0])/(2.0*M\_PI))*scalePhi);$$

where, scalePhi is modified for different rate points in a lossy configuration; a maximum value of 24 bits is used for azimuth angle when coding the geometry losslessly. The fixed-point implementation of the azimuth is available in a convertXyZToRp1 function.

Radius:

| Floating implementation | int64_t r0 = int64_t(std::round(hypot(xyz[0], xyz[1]))); |
| Fixed point implementation (in convertXyzToRpl) | int64_t xLaser = xyz[0] << 8; int64_t yLaser = xyz[1] << 8; int64_t r0 = isqrt(xLaser * xLaser + yLaser * yLaser) >> 8; |
| Floating implementation | auto phi0 = std::round((atan2(xyz[1], xyz[0])/(2.0 * M_PI)) * scalePhi); |
| Fixed point implementation (in convertXyzToRpl) | (*dst)[1] = (iatan2(yLaser, xLaser) + 3294199) >> 8; |

Resampling of a reference frame is now discussed. FIG. 11 is a conceptual diagram illustrating an example of azimuth resampling of motion compensated references. When global motion compensation is applied, the azimuth position of the points of the reference frame are modified depending on the motion parameters. Therefore, resampling may be needed or desired to align the azimuth points before and after compensation as illustrated in FIG. 11. The non-filled ovals represent points 1100 in an uncompensated reference frame (e.g., a reference frame without, or prior to, any global motion compensation being applied). The diagonal-line-filled ovals represent points 1102 in a global motion compensated version of the reference frame. The horizontal-line-filled ovals represent resampled points 1104 of the global motion compensated version of the reference frame. Thus, points 1100 have no global motion compensation applied, points 1102 have global motion compensation applied, and points 1104 have global motion compensation and resampling applied. As can be seen, the application of global motion compensation may cause the azimuth position of one or more of points 1102 to become misaligned with respective points of points 1100. By resampling. G-PCC encoder 200 or G-PCC decoder 300 may realign points 1102 (e.g., shown as resampled points 1104) with their respective points 1100.

G-PCC encoder 200 or G-PCC decoder 300 may apply the resampling process for each point P in the uncompensated reference frame (e.g., for each of points 1100) as follows:

A_ref is the azimuth value and L be the laser ID value associated with the point P.

If there is a point P1 (e.g., a point of points 1102) in the global-motion-compensated reference frame, which may also be referred to as a compensated reference frame, that has azimuth value equal to A_ref and laser ID equal to L, the radius of the point P is set equal to the radius of point P1, for example if G-PCC encoder 200 or G-PCC decoder 300 use a same buffer for storing the uncompensated reference frame as for storing a resampled reference frame.

Else, two points P2 and P3 are chosen in the global-motion-compensated reference frame with laser ID L such that azimuth of P2 is less than A_ref, azimuth of P3 is greater than A_ref. The radius of point P is set equal to a weighted interpolation of radii of points P2 and P3; the weights used for the interpolation is dependent on the difference between A_ref and the azimuth values of P2 and P3.

The resultant reference frame (obtained by resampling the motion compensated reference frame using azimuth values from the uncompensated reference frame), referred to as the resampled reference frame, may be used to predict the inter prediction candidates. For example, G-PCC encoder 200 or G-PCC decoder 300 may use the resampled reference frame to predict the inter prediction candidates. The two inter predictor candidates may therefore be indicated as [Res-Next, Res-NextNext], where the first part "Res" indicates that the candidates are obtained from the resampled reference frame and the second part "Next"/"NextNext" indicate the particular candidate in the reference frame (as mentioned above).

Additional candidates for inter prediction are now discussed. A modified inter predictor list was proposed in K. L. Loi. T. Nishi, T. Sugio, Inter Prediction for Predictive Geometry used in conjunction with Additional Global-motion-compensated reference frame, ISO/IEC JTC1/SC29/WG7 m61019, October 2022, where four inter prediction candidates are specified as follows:

[Zero-Next, Zero-NextNext, Glob-Next, Glob-NextNext]

In this example, the prefix "Zero" for the first two candidates indicates that the candidates are obtained directly from an uncompensated reference frame (no motion compensation or resampling) and the prefix "Glob" for the last two candidates indicates that the candidates are obtained directly from a global-motion-compensated reference frame.

The techniques of this disclosure include the following examples, which may be applied independently or in any combination.

Resampling may be beneficial for some sequences, whereas for other sequences, resampling may not be beneficial. To always enable resampling for all sequences, or always disable resampling for all sequences, may result in sub-optimal coding performance overall. As such, it may be beneficial to not always enable or disable resampling.

According to the techniques of this disclosure, in some examples, a flag is signaled in the bitstream to indicate whether resampling is to be applied to the reference frame. For example, G-PCC encoder 200 may signal a value of the flag in the bitstream to indicate whether resampling is to be applied to the reference frame and G-PCC decoder 300 may parse the flag to determine the value of the flag which may be indicative of whether resampling is to be applied to the reference frame. When the flag indicates that resampling is to be applied, the reference frame may be resampled, and the resampled reference frame may be used to derive one or more inter prediction candidates. For example, when the flag indicates that resampling is to be applied, G-PCC decoder 300 may resample the reference frame, and use the resampled reference frame to derive one or more inter prediction candidates. In some examples, the resampled reference frame may be used to obtain a subset of the inter prediction candidates and other inter prediction candidates may be obtained from an uncompensated reference frame (without global motion compensation or resampling) or a global-motion-compensated reference frame.

In some examples, a first syntax element may be signaled in the bitstream to indicate whether resampling is applied to reference frame of a particular slice or frame. The first syntax element may be signaled in a parameter set (sequence parameter set (SPS), geometry parameter set (GPS), etc.) or a slice header. It should be noted that a G-PCC slice may include a geometry data unit and an attribute data unit. As such, a slice header may include a data unit header, such as a geometry data unit header and/or an attribute data unit header. Thus, when signaling the first syntax element in a slice header, G-PCC encoder 200 may signal the first syntax element in a data unit header. For example, G-PCC encoder 200 may signal the first syntax element having a value that is indicative of whether resampling is applied to reference frame of a particular slice or frame. G-PCC decoder 300 may parse the first syntax element to determine the value of the first syntax element indicative of whether resampling is applied to reference frame of the particular slice or frame.

In one example, when the first syntax element is signaled at the slice level, it is a restriction of bitstream conformance that the values of the first syntax element in all slices of a frame are the same.

In some examples, when resampling is applied (e.g., when G-PCC encoder 200 or G-PCC decoder 300 applies resampling), resampling applies to all the inter prediction candidates. In other words, the inter prediction candidate list may be derived as follows:

If resampling ("Res") is applied for the reference frame of the current slice/frame, the inter prediction candidate list is set to [Res-Next, Res-NextNext].

Otherwise (resampling is not applied for the reference frame of the current slice/frame), the inter prediction candidate list is set to [Zero-Next, Zero-NextNext].

In some examples, when resampling is not used (e.g., when G-PCC encoder 200 or G-PCC decoder 300 does not use resampling), the global-motion-compensated reference frame may be used instead of the uncompensated reference frame.

In some examples, when resampling is applied (e.g., when G-PCC encoder 200 or G-PCC decoder 300 applies resampling), resampling is applied to all the inter prediction candidates. In other words, the inter prediction candidate list may be derived as follows:

If resampling is applied for the reference frame of the current slice/frame, the inter prediction candidate list is set to [Res-Next, Res-NextNext].

Otherwise (resampling is not applied for the reference frame of the current slice/frame), the inter prediction candidate list is set to [Glob-Next, Glob-NextNext].

In some examples, if a syntax element is signaled in the bitstream to indicate whether resampling is applied to the reference frame of a particular slice or frame, the resampled reference frame may only be used for a subset of the inter prediction candidates. For example, if G-PCC encoder 200 signals the syntax element in the bitstream indicative of whether resampling is applied to the reference frame of a particular slice or frame, the resampled reference frame may only be used for a subset of the inter prediction candidates. For example, resampling may only apply to the first two inter prediction candidates. If a resampling flag is enabled, then the inter prediction candidates may be specified as follows:

[*Res*-Next, *Res*-NextNext, Glob-Next, Glob-NextNext]

(e.g., the first two candidates are obtained from resampled reference frame, and the last two candidates are obtained from global-motion-compensated reference frame).

Otherwise, if resampling flag is disabled, then the inter prediction candidates may be specified as follows:

[Zero-Next, Zero-NextNext, Glob-Next, Glob-NextNext]

Signaling of global-motion-compensated candidates is now discussed. When global motion compensation is not applied for a particular slice or frame (or there is no motion, e.g., no rotation or translation), there may be no difference between the zero-motion-compensated frame and the global-motion-compensated frame. However, including both zero-motion-compensated and global-motion-compensated candidates in the inter predictor list causes inefficiency in coding the inter predictor candidate index. Therefore, it may be desirable to avoid including both zero-motion-compensated and global-motion-compensated candidates in the inter predictor list when there is no difference between the zero-motion-compensated frame and the global-motion-compensated frame.

According to the techniques of this disclosure, in some examples, when global motion compensation is not applied for a particular slice or frame, no inter prediction candidates from the global-motion-compensated frames are included in the inter predictor list. For example, G-PCC encoder 200 or G-PCC decoder 300 may not include inter prediction candidates from the global-motion-compensated frames in the inter predictor list. The following include examples of how G-PCC encoder 200 or G-PCC decoder 300 may generate the inter prediction candidate list.

In some examples, the inter prediction candidate list may be generated as follows:

If global motion compensation is not applied to the reference frame of the current slice/frame, the inter prediction candidate list is set to [Zero-Next, Zero-NextNext].

Otherwise (e.g., if global motion compensation is applied for the reference frame of the current slice or frame), the inter prediction candidate list is set to [Zero-Next, Zero-NextNext, Glob-Next, Glob-NextNext] or the inter prediction candidate list is set to [Glob-Next, Glob-NextNext].

In some examples, the inter prediction candidates may be derived from a resampled reference frame instead of an uncompensated reference frame. In some examples, resampling may be enabled by a flag as discussed above. In some examples, the inter prediction candidate list may be generated as follows:

If global motion compensation is not applied to the reference frame of the current slice or frame, the inter prediction candidate list is set to [Res-Next, Res-NextNext]. Or, in case resampling is disabled by a flag, the inter prediction candidate list is [Zero-Next, Zero-NextNext]

Otherwise (e.g., if global motion compensation is applied for the reference frame of the current slice or frame), the inter prediction candidate list is set to [Res-Next, Res-NextNext. Glob-Next, Glob-NextNext]. Or in case resampling is disabled (e.g., as signaled by a flag), the inter prediction candidate list is set to [Zero-Next, Zero-NextNext, Glob-Next, Glob-NextNext].

In some examples, G-PCC encoder 200 or G-PCC decoder 300 may determine that global motion is not to be applied. In some examples, the determination that global motion compensation is not applied may be determined by one or more of the following: 1) A flag (specifying whether global motion compensation is applied) signaled (e.g., by G-PCC encoder 200) in the bitstream indicates that global motion compensation is not applied; 2) The global motion parameters associated with the slice or frame are not signaled in the bitstream; and/or 3) The global motion parameters associated with the slice or frame correspond to zero rotation and zero translation.

Examples in the various aspects of this disclosure may be used individually or in any combination.

FIG. 12 is a flow diagram illustrating example resampling techniques according to one or more aspects of this disclosure. G-PCC encoder 200 or G-PCC decoder 300 may determine that resampling is to be applied to a first reference frame for a slice of the point cloud data or a frame of the point cloud data (1200). For example, G-PCC encoder 200 may determine to apply resampling to a first reference frame based on a change in azimuth values caused by the application of global motion to the reference. G-PCC encoder 200 may signal a flag in a bitstream whose value is indicative of resampling being applied. G-PCC decoder 300 may parse the flag to determine the value of the flag and determine that resampling is to be applied to the first reference frame.

G-PCC encoder 200 or G-PCC decoder 300 may apply resampling to the first reference frame to generate a resampled reference frame (1202). For example, G-PCC encoder 200 or G-PCC decoder 300 may resample the first reference frame to generate a resampled reference frame.

G-PCC encoder 200 or G-PCC decoder 300 may determine one or more inter prediction candidates based on the resampled reference frame (1204). For example, G-PCC encoder 200 or G-PCC decoder 300 may determine one or more inter prediction candidates from the resampled reference frame.

G-PCC encoder 200 or G-PCC decoder 300 may process the slice of the point cloud data or the frame of the point cloud data based on the one or more inter prediction candidates (1206). For example, G-PCC encoder 200 or G-PCC decoder 300 may select one of the one or more inter prediction candidates to use to process the slice of the point cloud data or the frame of the point cloud data.

In some examples, G-PCC encoder 200 or G-PCC decoder 300 may signal or parse (respectively) a flag in a bitstream, the flag being indicative of whether resampling is to be applied to the first reference frame. In some examples, G-PCC encoder 200 or G-PCC decoder 300 may determine one or more additional inter prediction candidates based on at least one of an uncompensated reference frame or a global-motion-compensated reference frame, wherein the one or more processors are configured to process the slice of the point cloud data or the frame of the point cloud data further based on the one or more additional inter prediction candidates.

In some examples, G-PCC encoder 200 or G-PCC decoder 300 may determine that the uncompensated reference frame includes the first reference frame. In some examples, G-PCC encoder 200 or G-PCC decoder 300 may generate the global-motion-compensated reference frame based on the first reference frame.

In some examples, the flag includes a syntax element indicative of whether resampling is to be applied to the first reference frame of the slice of the point cloud data or the frame of the point cloud data and wherein the syntax element is signaled in a parameter set or a slice header. In some examples, the syntax element is signaled in a geometry parameter set (GPS). In some examples, the syntax element is signaled in the slice header and wherein values of corresponding syntax elements for corresponding slices of a same frame as the slice of the point cloud data have a same value. In some examples, the slice header includes a data unit header and the syntax element is signaled in the data unit header.

In some examples, G-PCC encoder 200 or G-PCC decoder 300 may apply resampling to all inter prediction candidates of the first reference frame for the slice of the point cloud data or the frame of the point cloud data. In some examples, the one or more inter prediction candidates are first one or more inter prediction candidates, the slice of the point cloud data is a first slice, and the frame of the point cloud data is a first frame. In some examples, G-PCC encoder 200 or G-PCC decoder 300 may determine not to apply resampling to a second reference frame. G-PCC encoder 200 or G-PCC decoder 300 may apply global motion compensation to the second reference frame to generate a global-motion-compensated reference frame. G-PCC encoder 200 or G-PCC decoder 300 may determine, based on the determination not to apply resampling to the second reference frame, one or more second inter prediction candidates based on the global-motion-compensated reference frame. G-PCC encoder 200 or G-PCC decoder 300 may process a second slice of the point cloud data or a second frame of the point cloud data based on the one or more inter prediction candidates. In some examples, the one or more second inter prediction candidates include all second inter prediction candidates for the second reference frame.

In some examples, the one or more inter prediction candidates based on the resampled reference frame include one or more resampled inter prediction candidates. In some examples, G-PCC encoder 200 or G-PCC decoder 300 may determine one or more additional inter prediction candidates based on a global-motion-compensated reference frame, and G-PCC encoder 200 or G-PCC decoder 300 may process the slice of the point cloud data or the frame of the point cloud data further based on the one or more additional inter prediction candidates.

In some examples, the one or more inter prediction candidates are first one or more inter prediction candidates, the one or more additional inter prediction candidates are first one or more additional inter prediction candidates, the slice of the point cloud data is a first slice, and the frame of the point cloud data is a first frame. In some examples, G-PCC encoder 200 or G-PCC decoder 300 may determine not to apply resampling to a second reference frame. G-PCC encoder 200 or G-PCC decoder 300 may determine second one or more inter prediction candidates based on an uncompensated second reference frame. G-PCC encoder 200 or G-PCC decoder 300 may apply global motion compensation to the second reference frame to generate a global-motion-compensated reference frame. G-PCC encoder 200 or G-PCC decoder 300 may determine second one or more additional inter prediction candidates based on the global-motion-compensated reference frame and the determination not to apply resampling to the second reference frame. G-PCC encoder 200 or G-PCC decoder 300 may process a second slice of the point cloud data or a second frame of the point cloud data based on the second one or more inter prediction candidates and the second additional inter prediction candidates.

In some examples, the slice of the point cloud data is a first slice of the point cloud data, and the frame of the point cloud data is a first frame of the point cloud data. In some examples, G-PCC encoder 200 or G-PCC decoder 300 may determine that global motion compensation is not to be applied to a second slice of the point cloud data or a second frame of the point cloud data. Based on the determination that global motion compensation is not to be applied to the second slice of the point cloud data or the second frame of the point cloud data, G-PCC encoder 200 or G-PCC decoder 300 may refrain from including any inter prediction candidates from any global motion compensated frames in an inter predictor candidate list. G-PCC encoder 200 or G-PCC decoder 300 may process the second slice of the point cloud data or the second frame of the point cloud data based on the inter predictor candidate list.

In some examples, the one or more inter prediction candidates are first one or more prediction candidates and the resampled reference frame is a first resampled reference frame. In some examples, G-PCC encoder 200 or G-PCC decoder 300 may determine second inter predictor candidates for the inter predictor candidate list based on at least one of an unsampled reference frame or a second resampled reference frame. In some examples, G-PCC encoder 200 or G-PCC decoder 300 may signal or parse a flag in a bitstream indicative of whether resampling is to be applied to a second reference frame. G-PCC encoder 200 or G-PCC decoder 300 may determine to apply resampling to the second reference frame. G-PCC encoder 200 or G-PCC decoder 300 may apply resampling to the second reference frame to generate the second resampled reference frame based on the determination to apply resampling to the second reference frame.

In some examples, the determination that global motion compensation is not to be applied is based on at least one of: a flag signaled in a bitstream indicative of global motion compensation not being applied; global motion parameters associated with the second slice of the point cloud data or the second frame of the point cloud data not being signaled in the bitstream; or global motion parameters associated with the second slice of the point cloud data or the second frame of the point cloud data corresponding to zero rotation and zero translation.

In some examples, G-PCC encoder 200 or G-PCC decoder 300 may generate the point cloud.

Figure 13:
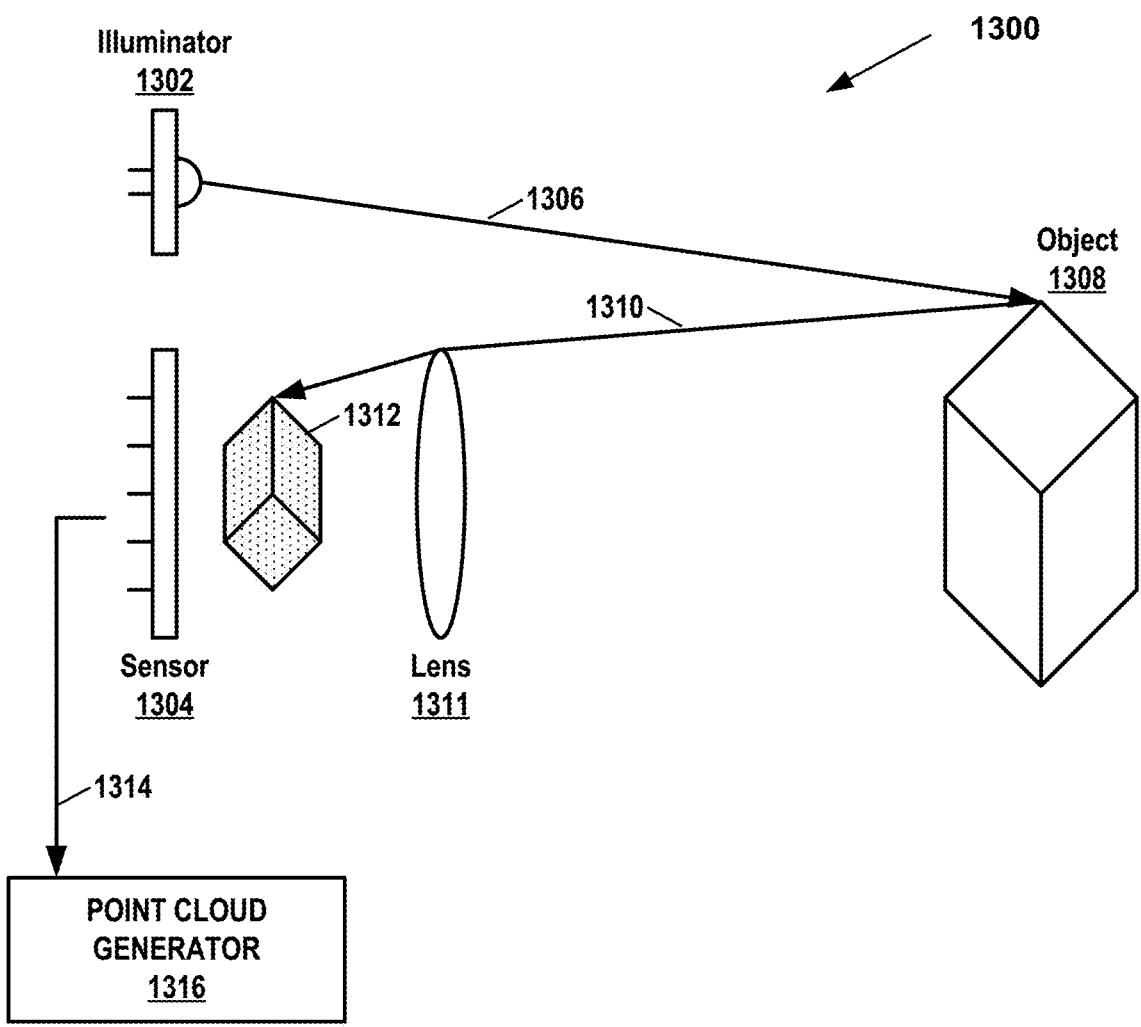
FIG. 13 is a conceptual diagram illustrating an example range-finding system that may be used with one or more techniques of this disclosure.

FIG. 13 is a conceptual diagram illustrating an example range-finding system 1300 that may be used with one or more techniques of this disclosure for coding point cloud data using predictive geometry coding and a vertical predictor. In the example of FIG. 13, range-finding system 1300 includes an illuminator 1302 and a sensor 1304. Illuminator 1302 may emit light 1306. In some examples, illuminator 1302 may emit light 1306 as one or more laser beams. Light 1306 may be in one or more wavelengths, such as an infrared wavelength or a visible light wavelength. In other examples, light 1306 is not coherent, laser light. When light 1306 encounters an object, such as object 1308, light 1306 creates returning light 1310. Returning light 1310 may include backscattered and/or reflected light. Returning light 1310 may pass through a lens 1311 that directs returning light 1310 to create an image 1312 of object 1308 on sensor 1304. Sensor 1304 generates signals 1314 based on image 1312. Image 1312 may comprise a set of points (e.g., as represented by dots in image 1312 of FIG. 23).

In some examples, illuminator 1302 and sensor 1304 may be mounted on a spinning structure so that illuminator 1302 and sensor 1304 capture a 360-degree view of an environment (e.g., a spinning LIDAR sensor). In other examples, range-finding system 1300 may include one or more optical components (e.g., mirrors, collimators, diffraction gratings, etc.) that enable illuminator 1302 and sensor 1304 to detect ranges of objects within a specific range (e.g., up to 360-degrees). Although the example of FIG. 23 only shows a single illuminator 1302 and sensor 1304, range-finding system 1300 may include multiple sets of illuminators and sensors.

In some examples, illuminator 1302 generates a structured light pattern. In such examples, range-finding system 1300 may include multiple sensors 1304 upon which respective images of the structured light pattern are formed. Range-finding system 1300 may use disparities between the images of the structured light pattern to determine a distance to an object 1308 from which the structured light pattern backscatters. Structured light-based range-finding systems may have a high level of accuracy (e.g., accuracy in the sub-millimeter range), when object 1308 is relatively close to sensor 1304 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 1300 is a time of flight (ToF)-based system. In some examples where range-finding system 1300 is a ToF-based system, illuminator 1302 generates pulses of light. In other words, illuminator 1302 may modulate the amplitude of emitted light 1306. In such examples, sensor 1304 detects returning light 1310 from the pulses of light 1306 generated by illuminator 1302. Range-finding system 1300 may then determine a distance to object 1308 from which light 1306 backscatters based on a delay between when light 1306 was emitted and detected and the known speed of light in air). In some examples, rather than (or in addition to) modulating the amplitude of the emitted light 1306, illuminator 1302 may modulate the phase of the emitted light 1306. In such examples, sensor 1304 may detect the phase of returning light 1310 from object 1308 and determine distances to points on object 1308 using the speed of light and based on time differences between when illuminator 1302 generated light 1306 at a specific phase and when sensor 1304 detected returning light 1310 at the specific phase.

In other examples, a point cloud may be generated without using illuminator 1302. For instance, in some examples, sensors 1304 of range-finding system 1300 may include two or more optical cameras. In such examples, range-finding system 1300 may use the optical cameras to capture stereo images of the environment, including object 1308. Range-finding system 1300 may include a point cloud generator 1316 that may calculate the disparities between locations in the stereo images. Range-finding system 1300 may then use the disparities to determine distances to the locations shown in the stereo images. From these distances, point cloud generator 1316 may generate a point cloud.

Sensors 1304 may also detect other attributes of object 1308, such as color and reflectance information. In the example of FIG. 13, a point cloud generator 1316 may generate a point cloud based on signals 1314 generated by sensor 1304. Range-finding system 1300 and/or point cloud generator 1316 may form part of data source 104 (FIG. 1). Hence, a point cloud generated by range-finding system 1300 may be encoded and/or decoded according to any of the techniques of this disclosure. Inter prediction and residual prediction, as described in this disclosure may reduce the size of the encoded data.

Figure 14:
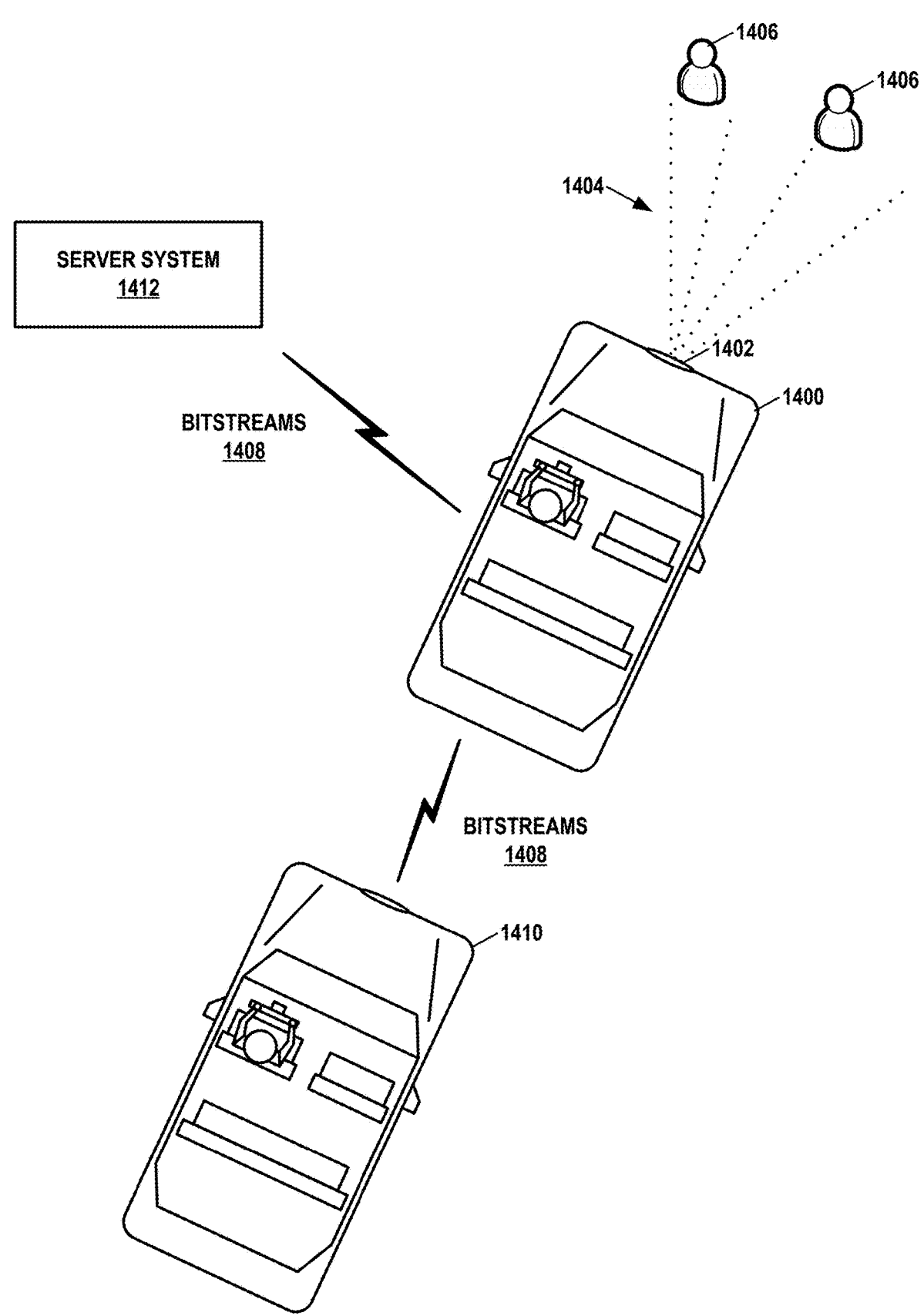
FIG. 14 is a conceptual diagram illustrating an example vehicle-based scenario in which one or more techniques of this disclosure may be used.

FIG. 14 is a conceptual diagram illustrating an example vehicle-based scenario in which one or more techniques of this disclosure for coding point cloud data using predictive geometry coding and a vertical predictor may be used. In the example of FIG. 14, a vehicle 1400 includes a range-finding system 1402. Range-finding system 1402 may be implemented in the manner discussed with respect to FIG. 23. Although not shown in the example of FIG. 14, vehicle 1400 may also include a data source, such as data source 104 (FIG. 1), and a G-PCC encoder, such as G-PCC encoder 200 (FIG. 1). In the example of FIG. 24, range-finding system 1402 emits laser beams 1404 that reflect off pedestrians 1406 or other objects in a roadway. The data source of vehicle 1400 may generate a point cloud based on signals generated by range-finding system 1402. The G-PCC encoder of vehicle 1400 may encode the point cloud to generate bitstreams 1408, such as geometry bitstream (FIG. 2) and attribute bitstream (FIG. 2). Inter prediction and residual prediction, as described in this disclosure may reduce the size of the geometry bitstream. Bitstreams 1408 may include many fewer bits than the unencoded point cloud obtained by the G-PCC encoder.

An output interface of vehicle 1400 (e.g., output interface 108 (FIG. 1) may transmit bitstreams 1408 to one or more other devices. Bitstreams 1408 may include many fewer bits than the unencoded point cloud obtained by the G-PCC encoder. Thus, vehicle 1400 may be able to transmit bitstreams 1408 to other devices more quickly than the unencoded point cloud data. Additionally, bitstreams 1408 may require less data storage capacity on a device.

In the example of FIG. 14, vehicle 1400 may transmit bitstreams 1408 to another vehicle 1410. Vehicle 1410 may include a G-PCC decoder, such as G-PCC decoder 300 (FIG. 1). The G-PCC decoder of vehicle 1410 may decode bitstreams 1408 to reconstruct the point cloud. Vehicle 1410 may use the reconstructed point cloud for various purposes. For instance, vehicle 1410 may determine based on the reconstructed point cloud that pedestrians 1406 are in the roadway ahead of vehicle 1400 and therefore start slowing down, e.g., even before a driver of vehicle 1410 realizes that pedestrians 1406 are in the roadway. Thus, in some examples, vehicle 1410 may perform an autonomous navigation operation based on the reconstructed point cloud.

Additionally, or alternatively, vehicle 1400 may transmit bitstreams 1408 to a server system 1412. Server system 1412 may use bitstreams 1408 for various purposes. For example, server system 1412 may store bitstreams 1408 for subsequent reconstruction of the point clouds. In this example, server system 1412 may use the point clouds along with other data (e.g., vehicle telemetry data generated by vehicle 1400) to train an autonomous driving system. In other example, server system 1412 may store bitstreams 1408 for subsequent reconstruction for forensic crash investigations.

FIG. 15 is a conceptual diagram illustrating an example extended reality system in which one or more techniques of this disclosure for coding point cloud data using predictive geometry coding and a vertical predictor may be used. Extended reality (XR) is a term used to cover a range of technologies that includes augmented reality (AR), mixed reality (MR), and virtual reality (VR). In the example of FIG. 15, a user 1500 is located in a first location 1502. User 1500 wears an XR headset 1504. As an alternative to XR headset 1504, user 1500 may use a mobile device (e.g., mobile phone, tablet computer, etc.). XR headset 1504 includes a depth detection sensor, such as a range-finding system, that detects positions of points on objects 1506 at location 1502. A data source of XR headset 1504 may use the signals generated by the depth detection sensor to generate a point cloud representation of objects 1506 at location 1502. XR headset 1504 may include a G-PCC encoder (e.g., G-PCC encoder 200 of FIG. 1) that is configured to encode the point cloud to generate bitstreams 1508. Inter prediction and residual prediction, as described in this disclosure may reduce the size of bitstream 1508.

XR headset 1504 may transmit bitstreams 1508 (e.g., via a network such as the Internet) to an XR headset 1510 worn by a user 1512 at a second location 1514. XR headset 1510 may decode bitstreams 1508 to reconstruct the point cloud. XR headset 1510 may use the point cloud to generate an XR visualization (e.g., an AR, MR, VR visualization) representing objects 1506 at location 1502. Thus, in some examples, such as when XR headset 1510 generates an VR visualization, user 1512 may have a 3D immersive experience of location 1502. In some examples, XR headset 1510 may determine a position of a virtual object based on the reconstructed point cloud. For instance, XR headset 1510 may determine, based on the reconstructed point cloud, that an environment (e.g., location 1502) includes a flat surface and then determine that a virtual object (e.g., a cartoon character) is to be positioned on the flat surface. XR headset 1510 may generate an XR visualization in which the virtual object is at the determined position. For instance, XR headset 1510 may show the cartoon character sitting on the flat surface.

Figure 16:
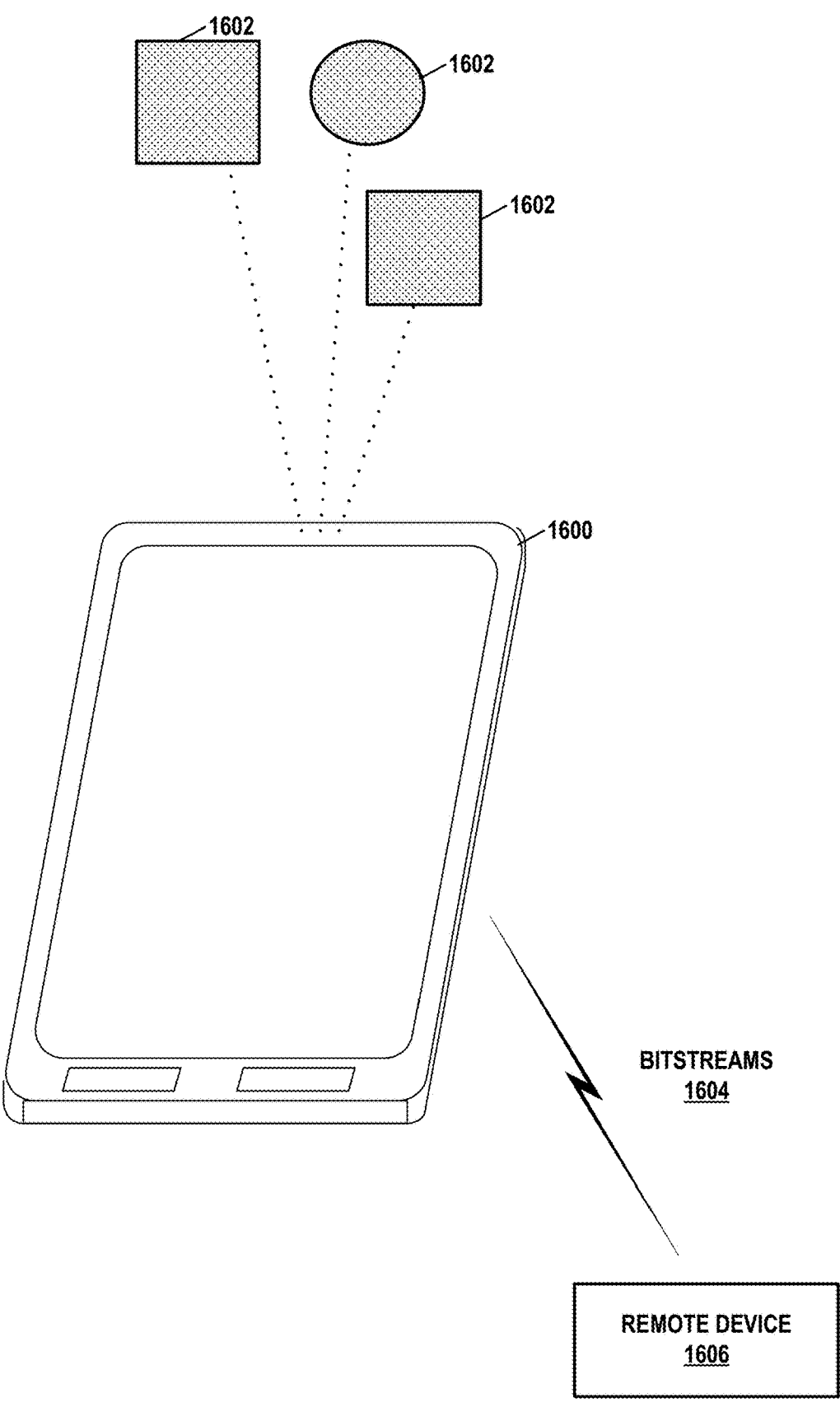
FIG. 16 is a conceptual diagram illustrating an example mobile device system in which one or more techniques of this disclosure may be used.

FIG. 16 is a conceptual diagram illustrating an example mobile device system in which one or more techniques of this disclosure for coding point cloud data using predictive geometry coding and a vertical predictor may be used. In the example of FIG. 16, a mobile device 1600 (e.g., a wireless communication device), such as a mobile phone or tablet computer, includes a range-finding system, such as a LIDAR system, that detects positions of points on objects 1602 in an environment of mobile device 1600. A data source of mobile device 1600 may use the signals generated by the depth detection sensor to generate a point cloud representation of objects 1602. Mobile device 1600 may include a G-PCC encoder (e.g., G-PCC encoder 200 of FIG. 1) that is configured to encode the point cloud to generate bitstreams 1604. In the example of FIG. 26, mobile device 1600 may transmit bitstreams to a remote device 1606, such as a server system or other mobile device. Inter prediction and residual prediction, as described in this disclosure may reduce the size of bitstreams 1604. Remote device 1606 may decode bitstreams 1604 to reconstruct the point cloud. Remote device 1606 may use the point cloud for various purposes. For example, remote device 1606 may use the point cloud to generate a map of environment of mobile device 1600. For instance, remote device 1606 may generate a map of an interior of a building based on the reconstructed point cloud. In another example, remote device 1606 may generate imagery (e.g., computer graphics) based on the point cloud. For instance, remote device 1606 may use points of the point cloud as vertices of polygons and use color attributes of the points as the basis for shading the polygons. In some examples, remote device 1606 may use the reconstructed point cloud for facial recognition or other security applications.

This disclosure includes the following non-limiting clauses.

Clause 1A. A method of processing point cloud data, the method comprising: signaling or parsing a flag in a bitstream, the flag being indicative of whether resampling is to be applied to a reference frame; determining that resampling is to be applied to the reference frame; applying resampling to the reference frame to generate a resampled reference frame; determining one or more inter prediction candidates based on the resampled reference frame; and processing the point cloud data based on the one or more inter prediction candidates.

Clause 2A. The method of clause 1A, further comprising determining one or more additional inter prediction candidates based on at least one of an uncompensated reference frame or a global-motion-compensated reference frame, wherein processing the point cloud data is further based on the one or more additional inter prediction candidates.

Clause 3A. The method of clause 1A or clause 2A, wherein the flag comprises a syntax element indicative of whether resampling is to be applied to the reference frame of a particular slice or particular frame of the point cloud data.

Clause 4A. The method of clause 3A, wherein the syntax element is signaled in a parameter set or a slice header.

Clause 5A. The method of clause 4A, wherein the syntax element is signaled in the slice header and wherein values of corresponding syntax elements for corresponding slices of a same frame as the particular slice have a same value.

Clause 6A. The method of any of clauses 1A-5A, further comprising applying resampling to all inter prediction candidates of the reference frame for a current slice or current frame.

Clause 7A. The method of any of clauses 1A-6A, wherein the reference frame is a first reference frame and the one or more inter prediction candidates are first one or more inter prediction candidates, the method further comprising: determining not to apply resampling to a second reference frame; applying global motion compensation to the second reference frame to generate a global-motion-compensated reference frame; determining one or more second inter prediction candidates based on the global-motion-compensated reference frame based on the determination not to apply resampling to the second reference frame; and processing the point cloud data based on the one or more inter prediction candidates.

Clause 8A. The method of clause 7A, further comprising determining all second inter prediction candidates for a reference frame based on the global-motion-compensated reference frame based on the determination not to apply resampling to the second reference frame.

Clause 9A. A method of processing point cloud data, the method comprising: determining that global motion compensation is not to be applied to a particular slice or a particular frame of the point cloud data; based on the determination that global motion compensation is not to be applied to the particular slice or the particular frame of the point cloud data, refraining from including any inter prediction candidates from any global motion compensated frames in an inter predictor candidate list for the particular slice or the particular frame; and processing the particular slice or the particular frame based on the inter predictor candidate list.

Clause 10A. The method of clause 9A, further comprising determining inter predictor candidates based on at least one of an unsampled reference frame or a resampled reference frame.

Clause 11A. The method of clause 10A, further comprising: signaling or parsing a flag in a bitstream indicative of whether resampling is to be applied to a reference frame; determining to apply resampling to the reference frame; and applying resampling to the reference frame to generate a resampled reference frame based on the determination to apply resampling to the reference frame.

Clause 12A. The method of any of clauses 9A-11A, wherein the determination that global motion compensation is not to be applied is based on at least one of: a flag signaled in a bitstream indicative of global motion compensation not being applied; global motion parameters associated with the particular slice or the particular frame not being signaled in the bitstream; or global motion parameters associated with the particular slice or the particular frame corresponding to zero rotation and zero translation.

Clause 13A. The method of any of clauses 1A-12A, further comprising generating the point cloud.

Clause 14A. A device for processing a point cloud, the device comprising one or more means for performing the method of any of clauses 1A-13A.

Clause 15A. The device of clause 14A, wherein the one or more means comprise one or more processors implemented in circuitry.

Clause 16A. The device of any of clauses 14A or 15A, further comprising a memory to store the data representing the point cloud.

Clause 17A. The device of any of clauses 14A-16A, wherein the device comprises a decoder.

Clause 18A. The device of any of clauses 14A-17A, wherein the device comprises an encoder.

Clause 19A. The device of any of clauses 14A-18A, further comprising a device to generate the point cloud.

Clause 20A. The device of any of clauses 14A-19A, further comprising a display to present imagery based on the point cloud.

Clause 21A. A computer-readable storage medium having stored thereon instructions that, when executed, cause one or more processors to perform the method of any of clauses 1A-13A.

Clause 1B. A method of processing point cloud data, the method comprising: determining that resampling is to be applied to a first reference frame for a slice of the point cloud data or a frame of the point cloud data; applying resampling to the first reference frame to generate a resampled reference frame; determining one or more inter prediction candidates based on the resampled reference frame; and processing the slice of the point cloud data or the frame of the point cloud data based on the one or more inter prediction candidates.

Clause 2B. The method of clause 1B, further comprising: signaling or parsing a flag in a bitstream, the flag being indicative of whether resampling is to be applied to the first reference frame.

Clause 3B. The method of clause 2B, wherein the flag comprises a syntax element indicative of whether resampling is to be applied to the first reference frame of the slice of the point cloud data or the frame of the point cloud data and wherein the syntax element is signaled in a parameter set or a slice header.

Clause 4B. The method of clause 3B, wherein the syntax element is signaled in a geometry parameter set (GPS).

Clause 5B. The method of clause 3B, wherein the syntax element is signaled in the slice header and wherein values of corresponding syntax elements for corresponding slices of a same frame as the slice of the point cloud data have a same value.

Clause 6B. The method of clause 3B or 5B, wherein the slice header comprises a data unit header and the syntax element is signaled in the data unit header.

Clause 7B. The method of any of clauses 1B-6B, further comprising determining one or more additional inter prediction candidates based on at least one of an uncompensated reference frame or a global-motion-compensated reference frame, wherein processing the slice of the point cloud data or the frame of the point cloud data is further based on the one or more additional inter prediction candidates.

Clause 8B. The method of clause 7B, wherein the uncompensated reference frame comprises the first reference frame.

Clause 9B. The method of clause 7B or clause 8B, further comprising generating the global-motion-compensated reference frame based on the first reference frame.

Clause 10B. The method of any of clauses 1B-9B, further comprising applying resampling to all inter prediction candidates of the first reference frame for the slice of the point cloud data or the frame of the point cloud data.

Clause 11B. The method of any of clauses 1B-10B, wherein the one or more inter prediction candidates are first one or more inter prediction candidates, the slice of the point cloud data is a first slice, and the frame of the point cloud data is a first frame, the method further comprising: determining not to apply resampling to a second reference frame; applying global motion compensation to the second reference frame to generate a global-motion-compensated reference frame; determining, based on the determination not to apply resampling to the second reference frame, one or more second inter prediction candidates based on the global-motion-compensated reference frame; and processing a second slice of the point cloud data or a second frame of the point cloud data based on the one or more inter prediction candidates.

Clause 12B. The method of clause 11B, wherein the one or more second inter prediction candidates comprise all second inter prediction candidates for the second reference frame.

Clause 13B. The method of any of clauses 1B-12B, wherein the one or more inter prediction candidates based on the resampled reference frame comprise one or more resampled inter prediction candidates, the method further comprising determining one or more additional inter prediction candidates based on a global-motion-compensated reference frame, wherein processing the slice of the point cloud data or the frame of the point cloud data is further based on the one or more additional inter prediction candidates.

Clause 14B. The method of clause 13B, wherein the one or more inter prediction candidates are first one or more inter prediction candidates, the one or more additional inter prediction candidates are first one or more additional inter prediction candidates, the slice of the point cloud data is a first slice, and the frame of the point cloud data is a first frame, the method further comprising: determining not to apply resampling to a second reference frame; determining second one or more inter prediction candidates based on an uncompensated second reference frame; applying global motion compensation to the second reference frame to generate a global-motion-compensated reference frame; determining second one or more additional inter prediction candidates based on the global-motion-compensated reference frame and the determination not to apply resampling to the second reference frame; and processing a second slice of the point cloud data or a second frame of the point cloud data based on the second one or more inter prediction candidates and the second one or more additional inter prediction candidates.

Clause 15B. The method of any of clauses 1B-14B, wherein the slice of the point cloud data is a first slice of the point cloud data, and the frame of the point cloud data is a first frame of the point cloud data, the method further comprising: determining that global motion compensation is not to be applied to a second slice of the point cloud data or a second frame of the point cloud data; based on the determination that global motion compensation is not to be applied to the second slice of the point cloud data or the second frame of the point cloud data, refraining from including any inter prediction candidates from any global motion compensated frames in an inter predictor candidate list; and processing the second slice of the point cloud data or the second frame of the point cloud data based on the inter predictor candidate list.

Clause 16B. The method of clause 15B, wherein the one or more inter prediction candidates are first one or more prediction candidates and the resampled reference frame is a first resampled reference frame, the method further comprising determining second inter predictor candidates for the inter predictor candidate list based on at least one of an unsampled reference frame or a second resampled reference frame.

Clause 17B. The method of clause 16B, further comprising: signaling or parsing a flag in a bitstream indicative of whether resampling is to be applied to a second reference frame; determining to apply resampling to the second reference frame; and applying resampling to the second reference frame to generate the second resampled reference frame based on the determination to apply resampling to the second reference frame.

Clause 18B. The method of any of clauses 15B-17B, wherein the determination that global motion compensation is not to be applied is based on at least one of: a flag signaled in a bitstream indicative of global motion compensation not being applied; global motion parameters associated with the second slice of the point cloud data or the second frame of the point cloud data not being signaled in the bitstream; or global motion parameters associated with the second slice of the point cloud data or the second frame of the point cloud data corresponding to zero rotation and zero translation.

Clause 19B. The method of any of clauses 1B-18B, further comprising generating the point cloud.

Clause 20B. A device for processing a point cloud, the device comprising: one or more memories configured to store point cloud data; and one or more processors implemented in circuitry and communicatively coupled to the one or more memories, the one or more processors being configured to: determine that resampling is to be applied to a first reference frame for a slice of the point cloud data or a frame of the point cloud data; apply resampling to the first reference frame to generate a resampled reference frame; determine one or more inter prediction candidates based on the resampled reference frame; and process the slice of the point cloud data or the frame of the point cloud data based on the one or more inter prediction candidates.

Clause 21B. The device of clause 20B, wherein the one or more processors are further configured to: signal or parse a flag in a bitstream, the flag being indicative of whether resampling is to be applied to the first reference frame.

Clause 22B. The device of clause 21B, wherein the flag comprises a syntax element indicative of whether resampling is to be applied to the first reference frame of the slice of the point cloud data or the frame of the point cloud data and wherein the syntax element is signaled in a parameter set or a slice header.

Clause 23B. The device of clause 22B, wherein the syntax element is signaled in a geometry parameter set (GPS).

Clause 24B. The device of clause 22B, wherein the syntax element is signaled in the slice header and wherein values of corresponding syntax elements for corresponding slices of a same frame as the slice of the point cloud data have a same value.

Clause 25B. The device of clause 22B or clause 24B, wherein the slice header comprises a data unit header and the syntax element is signaled in the data unit header.

Clause 26B. The device of any of clauses 20B-25B, wherein the one or more processors are further configured to determine one or more additional inter prediction candidates based on at least one of an uncompensated reference frame or a global-motion-compensated reference frame, wherein the one or more processors are configured to process the slice of the point cloud data or the frame of the point cloud data further based on the one or more additional inter prediction candidates.

Clause 27B. The device of clause 26B, wherein the uncompensated reference frame comprises the first reference frame.

Clause 28B. The device of clause 26B or clause 27B, wherein the one or more processors are further configured to generate the global-motion-compensated reference frame based on the first reference frame.

Clause 29B. The device of any of clauses 20B-28B, further comprising applying resampling to all inter prediction candidates of the first reference frame for the slice of the point cloud data or the frame of the point cloud data.

Clause 30B. The device of any of clauses 20B-29B, wherein the one or more inter prediction candidates are first one or more inter prediction candidates, the slice of the point cloud data is a first slice, and the frame of the point cloud data is a first frame, and wherein the one or more processors are further configured to: determine not to apply resampling to a second reference frame; apply global motion compensation to the second reference frame to generate a global-motion-compensated reference frame; determine, based on the determination not to apply resampling to the second reference frame, one or more second inter prediction candidates based on the global-motion-compensated reference frame; and process a second slice of the point cloud data or a second frame of the point cloud data based on the one or more inter prediction candidates.

Clause 31B. The device of clause 30B, wherein the one or more second inter prediction candidates comprise all second inter prediction candidates for the second reference frame.

Clause 32B. The device of any of clauses 20B-31B, wherein the one or more inter prediction candidates based on the resampled reference frame comprise one or more resampled inter prediction candidates, and wherein the one or more processors are further configured to determine one or more additional inter prediction candidates based on a global-motion-compensated reference frame, wherein the one or more processors process the slice of the point cloud data or the frame of the point cloud data further based on the one or more additional inter prediction candidates.

Clause 33B. The device of clause 32B, wherein the one or more inter prediction candidates are first one or more inter prediction candidates, the one or more additional inter prediction candidates are first one or more additional inter prediction candidates, the slice of the point cloud data is a first slice, and the frame of the point cloud data is a first frame, and wherein the one or more processors are further configured to: determine not to apply resampling to a second reference frame; determine second one or more inter prediction candidates based on an uncompensated second reference frame; apply global motion compensation to the second reference frame to generate a global-motion-compensated reference frame; determine second one or more additional inter prediction candidates based on the global-motion-compensated reference frame and the determination not to apply resampling to the second reference frame; and process a second slice of the point cloud data or a second frame of the point cloud data based on the second one or more inter prediction candidates and the second one or more additional inter prediction candidates.

Clause 34B. The device of any of clauses 20B-33B, wherein the slice of the point cloud data is a first slice of the point cloud data, and the frame of the point cloud data is a first frame of the point cloud data, and wherein the one or more processors are further configured to: determine that global motion compensation is not to be applied to a second slice of the point cloud data or a second frame of the point cloud data; based on the determination that global motion compensation is not to be applied to the second slice of the point cloud data or the second frame of the point cloud data, refrain from including any inter prediction candidates from any global motion compensated frames in an inter predictor candidate list; and process the second slice of the point cloud data or the second frame of the point cloud data based on the inter predictor candidate list.

Clause 35B. The device of clause 34B, wherein the one or more inter prediction candidates are first one or more prediction candidates and the resampled reference frame is a first resampled reference frame, and wherein the one or more processors are further configured to determine second inter predictor candidates for the inter predictor candidate list based on at least one of an unsampled reference frame or a second resampled reference frame.

Clause 36B. The device of clause 35B, wherein the one or more processors are further configured to: signal or parse a flag in a bitstream indicative of whether resampling is to be applied to a second reference frame; determine to apply resampling to the second reference frame; and apply resampling to the second reference frame to generate the second resampled reference frame based on the determination to apply resampling to the second reference frame.

Clause 37B. The device of any of clauses 34B-36B, wherein the determination that global motion compensation is not to be applied is based on at least one of: a flag signaled in a bitstream indicative of global motion compensation not being applied; global motion parameters associated with the second slice of the point cloud data or the second frame of the point cloud data not being signaled in the bitstream; or global motion parameters associated with the second slice of the point cloud data or the second frame of the point cloud data corresponding to zero rotation and zero translation.

Clause 38B. The device of any of clauses 20B-37B, wherein the one or more processors are further configured to generate the point cloud.

Clause 39B. The device of any of clauses 20B-38B, further comprising a display configured to present imagery based on the point cloud.

Clause 40B. Computer-readable storage media having stored thereon instructions that, when executed, cause one or more processors to: determine that resampling is to be applied to a first reference frame for a slice of point cloud data or a frame of the point cloud data; apply resampling to the first reference frame to generate a resampled reference frame; determine one or more inter prediction candidates based on the resampled reference frame; and process the slice of the point cloud data or the frame of the point cloud data based on the one or more inter prediction candidates.

Clause 41B. A device for processing point cloud data, the device comprising: means for determining that resampling is to be applied to a first reference frame for a slice of the point cloud data or a frame of the point cloud data; means for applying resampling to the first reference frame to generate a resampled reference frame; means for determining one or more inter prediction candidates based on the resampled reference frame; and means for processing the slice of the point cloud data or the frame of the point cloud data based on the one or more inter prediction candidates.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing point cloud data, the method comprising:
  determining that resampling is to be applied to a first reference frame for a first slice of the point cloud data or a first frame of the point cloud data;
  applying resampling to the first reference frame to generate a resampled reference frame;
  determining one or more first inter prediction candidates based on the resampled reference frame;
  processing the first slice of the point cloud data or the first frame of the point cloud data based on the one or more first inter prediction candidates;
  determining that global motion compensation is not to be applied to a second slice of the point cloud data or a second frame of the point cloud data;
  based on the determination that global motion compensation is not to be applied to the second slice of the point cloud data or the second frame of the point cloud data, refraining from including any inter prediction candidates from any global motion compensated frames in an inter predictor candidate list; and
  processing the second slice of the point cloud data or the second frame of the point cloud data based on the inter predictor candidate list.

2. The method of claim 1, further comprising:
  signaling or parsing a flag in a bitstream, the flag being indicative of whether resampling is to be applied to the first reference frame.

3. The method of claim 2, wherein the flag comprises a syntax element indicative of whether resampling is to be applied to the first reference frame of the first slice of the point cloud data or the first frame of the point cloud data and wherein the syntax element is signaled in a parameter set or a slice header.

4. The method of claim 3, wherein the syntax element is signaled in a geometry parameter set (GPS).

5. The method of claim 3, wherein the syntax element is signaled in the slice header and wherein values of corresponding syntax elements for corresponding slices of a same frame as the first slice of the point cloud data have a same value.

6. The method of claim 3, wherein the slice header comprises a data unit header and the syntax element is signaled in the data unit header.

7. The method of claim 1, further comprising determining one or more additional inter prediction candidates based on at least one of an uncompensated reference frame or a global-motion-compensated reference frame, wherein processing the first slice of the point cloud data or the first frame of the point cloud data is further based on the one or more additional inter prediction candidates.

8. The method of claim 7, wherein the uncompensated reference frame comprises the first reference frame.

9. The method of claim 7, further comprising generating the global-motion-compensated reference frame based on the first reference frame.

10. The method of claim 1, further comprising applying resampling to all inter prediction candidates of the first reference frame for the first slice of the point cloud data or the first frame of the point cloud data.

11. The method of claim 1, further comprising:
determining not to apply resampling to a third reference frame;
applying global motion compensation to the third reference frame to generate a global-motion-compensated reference frame;
determining, based on the determination not to apply resampling to the third reference frame, one or more third inter prediction candidates based on the global-motion-compensated reference frame; and
processing a third slice of the point cloud data or a third frame of the point cloud data based on the one or more third inter prediction candidates.

12. The method of claim 11, wherein the one or more third inter prediction candidates comprise all third inter prediction candidates for the third reference frame.

13. The method of claim 1, wherein the one or more first inter prediction candidates based on the resampled reference frame comprise one or more first resampled inter prediction candidates, the method further comprising determining one or more additional first inter prediction candidates based on a global-motion-compensated reference frame, wherein processing the first slice of the point cloud data or the first frame of the point cloud data is further based on the one or more additional first inter prediction candidates.

14. The method of claim 13, further comprising:
determining not to apply resampling to a third reference frame;
determining one or more third inter prediction candidates based on an uncompensated third reference frame;
applying global motion compensation to the third reference frame to generate a global-motion-compensated reference frame;
determining one or more additional third inter prediction candidates based on the global-motion-compensated reference frame and the determination not to apply resampling to the third reference frame; and processing a third slice of the point cloud data or a third frame of the point cloud data based on the one or more third inter prediction candidates and the one or more additional third inter prediction candidates.

15. The method of claim 1, wherein the resampled reference frame is a first resampled reference frame, the method further comprising determining one or more second inter predictor candidates for the inter predictor candidate list based on at least one of an unsampled reference frame or a second resampled reference frame.

16. The method of claim 15, further comprising:
signaling or parsing a flag in a bitstream indicative of whether resampling is to be applied to a second reference frame;
determining to apply resampling to the second reference frame; and
applying resampling to the second reference frame to generate the second resampled reference frame based on the determination to apply resampling to the second reference frame.

17. The method of claim 1, wherein the determination that global motion compensation is not to be applied to the second slice of the point cloud data or the second frame of the point cloud data is based on at least one of:
a flag signaled in a bitstream indicative of global motion compensation not being applied;
global motion parameters associated with the second slice of the point cloud data or the second frame of the point cloud data not being signaled in the bitstream; or
global motion parameters associated with the second slice of the point cloud data or the second frame of the point cloud data corresponding to zero rotation and zero translation.

18. The method of claim 1, further comprising generating the point cloud.

19. A device for processing a point cloud, the device comprising:
one or more memories configured to store point cloud data; and
one or more processors implemented in circuitry and communicatively coupled to the one or more memories, the one or more processors being configured to:
determine that resampling is to be applied to a first reference frame for a first slice of the point cloud data or a first frame of the point cloud data;
apply resampling to the first reference frame to generate a resampled reference frame;
determine one or more first inter prediction candidates based on the resampled reference frame;
process the first slice of the point cloud data or the first frame of the point cloud data based on the one or more first inter prediction candidates;
determine that global motion compensation is not to be applied to a second slice of the point cloud data or a second frame of the point cloud data;
based on the determination that global motion compensation is not to be applied to the second slice of the point cloud data or the second frame of the point cloud data, refrain from including any inter prediction candidates from any global motion compensated frames in an inter predictor candidate list; and
process the second slice of the point cloud data or the second frame of the point cloud data based on the inter predictor candidate list.

20. The device of claim 19, wherein the one or more processors are further configured to:

signal or parse a flag in a bitstream, the flag being indicative of whether resampling is to be applied to the first reference frame.

21. The device of claim 20, wherein the flag comprises a syntax element indicative of whether resampling is to be applied to the first reference frame of the first slice of the point cloud data or the first frame of the point cloud data and wherein the syntax element is signaled in a parameter set or a slice header.

22. The device of claim 21, wherein the syntax element is signaled in a geometry parameter set (GPS).

23. The device of claim 21, wherein the syntax element is signaled in the slice header and wherein values of corresponding syntax elements for corresponding slices of a same frame as the first slice of the point cloud data have a same value.

24. The device of claim 21, wherein the slice header comprises a data unit header and the syntax element is signaled in the data unit header.

25. The device of claim 19, wherein the one or more processors are further configured to determine one or more additional inter prediction candidates based on at least one of an uncompensated reference frame or a global-motion-compensated reference frame, wherein the one or more processors are configured to process the first slice of the point cloud data or the first frame of the point cloud data further based on the one or more additional inter prediction candidates.

26. The device of claim 25, wherein the uncompensated reference frame comprises the first reference frame.

27. The device of claim 25, wherein the one or more processors are further configured to generate the global-motion-compensated reference frame based on the first reference frame.

28. The device of claim 19, further comprising applying resampling to all inter prediction candidates of the first reference frame for the first slice of the point cloud data or the first frame of the point cloud data.

29. The device of claim 19, wherein the one or more processors are further configured to:

determine not to apply resampling to a third reference frame;

apply global motion compensation to the third reference frame to generate a global-motion-compensated reference frame;

determine, based on the determination not to apply resampling to the second third reference frame, one or more second third inter prediction candidates based on the global-motion-compensated reference frame; and process a third slice of the point cloud data or a third frame of the point cloud data based on the one or more third inter prediction candidates.

30. The device of claim 29, wherein the one or more third inter prediction candidates comprise all third inter prediction candidates for the third reference frame.

31. The device of claim 19, wherein the one or more first inter prediction candidates based on the resampled reference frame comprise one or more first resampled inter prediction candidates, and wherein the one or more processors are further configured to determine one or more additional first inter prediction candidates based on a global-motion-compensated reference frame, wherein the one or more processors process the first slice of the point cloud data or the first frame of the point cloud data further based on the one or more additional first inter prediction candidates.

32. The device of claim 31, wherein the one or more processors are further configured to:

determine not to apply resampling to a third reference frame;

determine one or more third inter prediction candidates based on an uncompensated third reference frame;

apply global motion compensation to the third reference frame to generate a global-motion-compensated reference frame;

determine one or more additional third inter prediction candidates based on the global-motion-compensated reference frame and the determination not to apply resampling to the third reference frame; and process a third slice of the point cloud data or a third frame of the point cloud data based on the one or more third inter prediction candidates and the one or more additional third inter prediction candidates.

33. The device of claim 19, wherein the resampled reference frame is a first resampled reference frame, and wherein the one or more processors are further configured to determine one or more second inter predictor candidates for the inter predictor candidate list based on at least one of an unsampled reference frame or a second resampled reference frame.

34. The device of claim 33, wherein the one or more processors are further configured to:

signal or parse a flag in a bitstream indicative of whether resampling is to be applied to a second reference frame;

determine to apply resampling to the second reference frame; and apply resampling to the second reference frame to generate the second resampled reference frame based on the determination to apply resampling to the second reference frame.

35. The device of claim 19, wherein the determination that global motion compensation is not to be applied to the second slice of the point cloud data or the second frame of the point cloud data is based on at least one of:

a flag signaled in a bitstream indicative of global motion compensation not being applied;

global motion parameters associated with the second slice of the point cloud data or the second frame of the point cloud data not being signaled in the bitstream; or global motion parameters associated with the second slice of the point cloud data or the second frame of the point cloud data corresponding to zero rotation and zero translation.

36. The device of claim 19, wherein the one or more processors are further configured to generate the point cloud.

37. The device of claim 19, further comprising a display configured to present imagery based on the point cloud.

38. Non-transitory computer-readable storage media having stored thereon instructions that, when executed, cause one or more processors to:

determine that resampling is to be applied to a first reference frame for a first slice of point cloud data or a first frame of the point cloud data;

apply resampling to the first reference frame to generate a resampled reference frame;

determine one or more first inter prediction candidates based on the resampled reference frame;

process the first slice of the point cloud data or the first frame of the point cloud data based on the one or more first inter prediction candidates;

determine that global motion compensation is not to be applied to a second slice of the point cloud data or a second frame of the point cloud data;

based on the determination that global motion compensation is not to be applied to the second slice of the point cloud data or the second frame of the point cloud
data, refrain from including any inter prediction can-
didates from any global motion compensated frames in
an inter predictor candidate list; and process the second slice of the point cloud data or the
second frame of the point cloud data based on the inter
predictor candidate list.

39. A device for processing point cloud data, the device
comprising:

means for determining that resampling is to be applied to
a first reference frame for a first slice of the point cloud
data or a first frame of the point cloud data;

means for applying resampling to the first reference frame
to generate a resampled reference frame;

means for determining one or more first inter prediction candidates based on the resampled reference frame; and means for processing the first slice of the point cloud data
or the first frame of the point cloud data based on the
one or more first inter prediction candidates;

means for determining that global motion compensation is
not to be applied to a second slice of the point cloud
data or a second frame of the point cloud data;

means for, based on the determination that global motion
compensation is not to be applied to the second slice of
the point cloud data or the second frame of the point
cloud data, refraining from including any inter predic-
tion candidates from any global motion compensated
frames in an inter predictor candidate list; and means for processing the second slice of the point cloud
data or the second frame of the point cloud data based
on the inter predictor candidate list.

\* \* \* \* \*